United States Patent
Cornelius et al.

(10) Patent No.: US 11,606,230 B2
(45) Date of Patent: Mar. 14, 2023

(54) CHANNEL EQUALIZATION

(71) Applicant: Apple Inc., Cupertino, CA (US)

(72) Inventors: William P. Cornelius, Saratoga, CA (US); Seungyong Baek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 17/190,997

(22) Filed: Mar. 3, 2021

(65) Prior Publication Data

US 2022/0286334 A1  Sep. 8, 2022

(51) Int. Cl.
| | | |
|---|---|---|
| *H04L 27/01* | (2006.01) | |
| *H04L 27/227* | (2006.01) | |
| *H04L 27/20* | (2006.01) | |
| *H04L 25/03* | (2006.01) | |

(52) U.S. Cl.
CPC .......... *H04L 27/01* (2013.01); *H04L 27/2014* (2013.01); *H04L 27/2272* (2013.01); *H04L 2025/03535* (2013.01)

(58) Field of Classification Search
CPC . H04L 27/01; H04L 27/2014; H04L 27/2272; H04L 2025/03535
See application file for complete search history.

(56) References Cited

U.S. PATENT DOCUMENTS

| | | | |
|---|---|---|---|
| 4,677,506 A | 6/1987 | Kaneko et al. | |
| 5,239,561 A | 8/1993 | Wong et al. | |
| 6,914,559 B2 | 7/2005 | Marks | |
| 7,224,737 B2 | 5/2007 | Voutilainen | |
| 8,306,498 B2 * | 11/2012 | Yu | H03D 7/1441 |
| | | | 455/302 |
| 8,995,842 B1 | 3/2015 | Kojima et al. | |
| 9,143,369 B2 | 9/2015 | He et al. | |
| 9,521,021 B2 | 12/2016 | He et al. | |
| 10,340,893 B1 * | 7/2019 | Ahirwar | H03H 17/0416 |
| 11,018,656 B1 | 5/2021 | Sun | |
| 11,240,077 B2 | 2/2022 | Lee et al. | |
| 11,308,415 B2 | 4/2022 | Verdon-Akzam | |
| 2003/0152154 A1 | 8/2003 | Johnson | |
| 2005/0078712 A1 | 4/2005 | Voutilainen | |
| 2009/0281781 A1 | 11/2009 | Rose et al. | |
| 2021/0242861 A1 | 8/2021 | Sun | |
| 2021/0367816 A1 | 11/2021 | Ransijn | |

(Continued)

FOREIGN PATENT DOCUMENTS

| | | |
|---|---|---|
| CN | 103597801 A | 2/2014 |
| CN | 103356221 B | 3/2016 |
| CN | 104050122 B | 7/2017 |

(Continued)

OTHER PUBLICATIONS

Non Final Office Action dated Jun. 9, 2022 in U.S. Appl. No. 17/196,363, filed Mar. 9, 2021, 15 pages.

*Primary Examiner* — Jean B Corrielus
(74) *Attorney, Agent, or Firm* — Kilpatrick Townsend & Stockton, LLP

(57) ABSTRACT

Circuits, methods, and apparatus that provide improved data recovery for data transmitted through a channel of limited bandwidth. An example can provide circuits, methods, and apparatus that can equalize losses in a physical channel. This equalization can provide an overall channel response that is more consistent and uniform.

21 Claims, 18 Drawing Sheets

(56) References Cited

U.S. PATENT DOCUMENTS

2022/0294545 A1    9/2022   Cornelius

FOREIGN PATENT DOCUMENTS

| | | | | |
|---|---|---|---|---|
| CN | 109347634 A | | 2/2019 | |
| CN | 107959563 B | | 11/2019 | |
| CN | 112529203 A | | 3/2021 | |
| CN | 112884154 A | | 6/2021 | |
| CN | 113052317 A | | 6/2021 | |
| GB | 2427089 A | * | 12/2006 | ............ H03D 3/009 |
| JP | 0317254 A | | 1/1991 | |
| JP | 4731774 B2 | | 7/2011 | |
| KR | 100842775 | * | 7/2008 | |
| WO | 03017254 A1 | | 2/2003 | |
| WO | 2005045459 A2 | | 5/2005 | |
| WO | 2021067960 A1 | | 4/2021 | |
| WO | 2021086625 A1 | | 5/2021 | |

* cited by examiner

CHANNEL EQUALIZATION

BACKGROUND

Computers and computing devices, such as laptops, all-in-one computers, smartphones, tablets, and other devices, perform data operations using binary data. Binary data is made up of individual bits, which can have one of two states, commonly referred to as a "0" (zero) and a "1" (one.) These states can also be referred to as the ON and OFF states, or the HIGH and LOW states. This data can be transmitted between devices. Data having different numbers of levels can also be transmitted between devices.

Computers and computing devices can communicate with each other over cables. For example, cables can convey binary data between these computers and computing devices. The cables can include connector inserts at each end, where the connector inserts can be inserted into corresponding connector receptacles on each computer or computing device. The cable can include a number of conductors, where each conductor is attached or otherwise coupled to one or more contacts or pins in the connector inserts at each end. These conductors can include wires, coaxial cables, fiber-optic cables, or other types of conductors.

These conductors, connector inserts, and connector receptacles can convey data or other signals, power supplies, or other voltages between or among computing devices. But these structures can distort or degrade the data signals being conveyed. That is, the cable, including its conductors and connector inserts, along with the connector receptacles and associated structures in each computer or computing device, can form a physical channel that can filter and distort signals being conveyed through the physical channel.

Such a physical channel can limit high-frequency data transmission, thereby forcing data rate reductions and the slowing transfers of data files and packets. It can also lead to data errors that can necessitate the re-transmission of data. The slowed data rates and repeated data transmissions can slow system response, expend wasted power, and frustrate users. Accordingly, it can be desirable to have improved methods of data recovery that can help to overcome these limitations.

Thus, what is needed are circuits, methods, and apparatus that provide improved data recovery for data transmitted through a physical channel of limited bandwidth.

SUMMARY

Accordingly, embodiments of the present invention can provide circuits, methods, and apparatus that provide improved data recovery for data transmitted through a physical channel of limited bandwidth. An illustrative embodiment of the present invention can provide circuits, methods, and apparatus that can equalize a physical channel. This equalization can provide a combined channel response that is more consistent and uniform than the response of an unequalized physical channel. The equalization can further be adjusted to provide a received eye diagram that is optimized for accurate data recovery.

In an illustrative embodiment of the present invention, a transmitter can provide data through a physical channel where it is received by an analog front end, such as a continuous-time front end (CTFE.) The transmitter and the CTFE can form an electrical channel. The combination of the physical channel and the electrical channel can form a combined channel having a combined channel frequency response. The CTFE in the electrical channel can be adjusted to compensate for non-ideal characteristics of the transmitter and the physical channel to give an improved combined channel frequency response. The improved combined channel frequency response can provide a received data having an eye diagram that is optimized for data recover in a receiver.

The physical channel can be arranged in various ways. In one example, a transmitter of a first computing device can send data through a physical channel by providing data through a first connector receptacle and associated structures on the first computing device to a first connector insert of a cable. The cable can receive the data at the first connector insert at a first end of the cable and convey the data to a second connector insert at a second end of the cable. The second connector insert can then pass the data to a second connector receptacle and associated structures of a second computing device. The physical channel can thus extend from the transmitter in the first computing device to receiving circuitry in the second computing device. The physical channel can have a non-uniform frequency response that can degrade data reception and cause errors. That is, the physical channel can have a frequency response where a gain of the physical channel varies as a function of frequency, where the gain can have a value of one, a value greater than one, or a value less than one.

Receiving circuitry in the second electronic device can form at least part of an electrical channel that can include a CTFE. The CTFE can include an equalizer or other circuits, such as a variable-gain amplifier. These circuits in the electrical channel can be adjusted to compensate for the non-ideal physical channel. The combination of the physical channel and the adjusted electrical channel in the receiving circuitry can provide for a combined channel frequency response that is more consistent and uniform than the frequency response of the physical channel and the transmitter.

These and other embodiments of the present invention can provide a method of receiving data. Initially, one or more characteristics of a physical channel, or more specifically, one or more characteristics of a combined physical channel and electrical channel, can be determined. The one or more characteristics of the combined channel can be a bandwidth of the combined channel, the gain of the combined channel at specific frequencies or one or more ranges of frequencies, or other characteristics. The one or more characteristics of the combined channel can then be used to modify or adjust electrical characteristics of one or more receiving circuits, such as a CTFE, in the electrical channel. The combination of the physical channel characteristics and adjusted electrical characteristics can provide for a combined channel frequency response that is more consistent and uniform as compared to the physical channel frequency response or unadjusted combined channel frequency response.

These and other embodiments of the present invention can provide various methods of adjusting a CTFE to an initial state. Once the initial state is adjusted, data can be received. While data is received, further adjustments to the CTFE can be made.

For example, these and other embodiments of the present invention can provide a method of initially adjusting a CTFE. In one example, multiple tones can be transmitted through an unadjusted combined channel. A first tone at a first frequency, a second tone at a second frequency, and a third tone at a third frequency can be transmitted through an unadjusted combined channel. An amplitude of the received first tone can be determined (relative to the amplitude of the transmitted first tone), an amplitude of the received second tone can be determined (again, relative to the amplitude of the transmitted second tone), and an amplitude of the received third tone can be determined (again, relative to the amplitude of the transmitted third tone.) The amplitude of the received first tone can be indicative of the DC or low-frequency gain of the physical channel. The amplitude of the second received second tone can be indicative of the gain of the physical channel near the expected maximum bandwidth, or Nyquist frequency. The third tone and tones at other frequencies, such as frequencies less than the first frequency, between the first frequency and the second frequency, or greater than the second frequency can be used instead of or as well as the first tone and the second tone. The amplitudes of the received first tone, the received second tone, and the received third tone can be used to characterize the combined channel frequency response and to provide settings for the CTFE. In these and other embodiments of the present invention, the received tones, received data, and other received signals are those tones, data, and other signals that are provided as outputs by the CTFE and received by an amplitude detect circuit, such as an amplitude detect slicer, peak detector, or other circuit or combination of circuits.

In these and other embodiments of the present invention, these tones can be transmitted in various ways. Each of these tones can be data at a single frequency. For example, a tone at the first frequency can be transmitted by a first computing device and received by a second computing device, a tone at the second frequency can be transmitted by a first computing device and received by a second computing device, followed by a tone at the third frequency, again transmitted by a first computing device and received by a second computing device. Alternatively, data having other bit sequences can be transmitted from the first computing device to the second computing device. A receiver in the second computing device can detect various data patterns and measure their resulting amplitudes. The data can be training data, such as a test pattern, a swept frequency, or it can be actual data being transmitted between devices. The data can alternatively be a pseudo-random bit stream, such as PRBS-11.

In these and other embodiments of the present invention, initial settings for a CTFE can be found in other ways. For example, a de-emphasis of an equalizer or other circuit in a CTFE can be set to a maximum by reducing a low-frequency gain of an equalizer in the CTFE. The de-emphasis of the equalizer can be reduced until the amplitude of the received signal (the output of the CTFE) begins to increase. The settings at or near this point can be retained and used as initial CTFE settings. This method can be particularly useful when a lock of the phase-locked loop in the receiver can't be achieved initially. Once an adjustment is made to the CTFE, the phase-locked loop can more readily achieve lock.

The ability to adjust a CTFE in the absence of a locked phase-locked loop can be extended to circuits where a phase-locked loop is not needed. For example, a linear redriver can be employed to gain a signal through a cable, repeater, router, hub, or other circuit. Such a circuit might not need to retime data, so a phase-locked loop might not be included. Instead, a free running, unlocked clock signal can be used to adjust the CTFE.

In circuits with a phase-locked loop, once the CTFE is adjusted and the phase-locked loop is locked, data can be received. This data can include first data having a low frequency and second data having a higher frequency. The amplitude of the received first data and the amplitude of the received second data can be used to further adjust characteristics of circuits in the CTFE, such as an equalizer, a variable-gain amplifier, or both. These characteristics can include a DC or low-frequency gain, also referred to as de-emphasis. The equalizer can be a continuous-time-linear equalizer. The amplitude of the received second (higher-frequency) data can be used to adjust the amount of de-emphasis provided by the equalizer. For example, if the amplitude of the received second data (as compared to the amplitude of the received first data) is below a first threshold, the de-emphasis of the equalizer can be increased. Conversely, if the amplitude of the received second data (as compared to the amplitude of the received first data) is higher than the first threshold, the de-emphasis of the equalizer can be decreased. In these and other embodiments of the present invention, the received data is provided as an output by the CTFE and received by an amplitude detect circuit, such as an amplitude detect slicer, peak detector, or other circuit or combination of circuits.

In these and other embodiments of the present invention, the equalizer can have a variable low-frequency gain, while the high-frequency gain converges near the Nyquist frequency. With such an equalizer, the de-emphasis can be increased by lowering the low-frequency gain, or decreased by raising the low-frequency gain. In such a circuit, the amplitude of the received second data (as compared to the received first data) can be adjusted by varying the low-frequency gain of the equalizer.

In these and other embodiments of the present invention, the amplitude of the received low-frequency first data, as well as a ratio of the amplitude of the received high-frequency second data to the amplitude of the received first data can be used to adjust characteristics of one or more circuits in a CTFE, such as an equalizer, in a CTFE where the equalizer can also act as a variable-gain amplifier. For example, if the amplitude of the received second data (as compared to the amplitude of the received first data) is below a first threshold, the de-emphasis of the equalizer can be increased. Conversely, if the amplitude of the received second data (as compared to the amplitude of the received first data) is higher than the first threshold, the de-emphasis of the equalizer can be decreased.

In these and other embodiments of the present invention, the amplitude of the received data can be determined in various ways. For example, a receiver can receive a pseudo-random bit stream, such as a PRBS-11. A pattern filter can detect the occurrence of specific data patterns. When a specific data pattern is received, a data slicer can measure an amplitude of the received signal for the data pattern. For example, the first low-frequency data can include data patterns such as a 10001 or 01110 pattern. When one of these patterns is detected, the amplitude of the received signal can be measured using a data slicer. The stored difference between the low voltage level of a pattern such as the 10001 pattern and the high 01110 pattern can be determined and used as the amplitude of the low-frequency data. Similarly, the second high-frequency data can include patterns such as a 010 or 101 pattern. When one of these patterns is detected, the amplitude of the received signal can be measured using a data slicer. The stored difference between the low voltage level of a pattern such as the 101 pattern and the high 010 pattern can be determined and used as the amplitude of the low-frequency data. The amplitude of the low-frequency first data and high-frequency second data can be used to adjust one or more circuits in a CTFE as before. In these and other embodiments of the present invention, the received tones, received data, and other received signals are those tones, data, and other signals that are provided as outputs by the CTFE and received by an amplitude detect circuit, such as an amplitude detect slicer, peak detector, or other circuit or combination of circuits.

More specifically, a data slicer, such as an amplitude detect data slicer, can be implemented as a statistical amplitude or peak detector, which can include an accumulator. This accumulator can count up or be incremented by a first value "N1" when a given pattern is above a slicer threshold and decremented by a second value "M1" when the given pattern is below a slicer threshold. The threshold of the slicer can adjusted so the accumulator is half full for a given N1/M1 ratio. At this setting, the waveform can be that ratio of time above and below the threshold. As one example, where N1 is set at 20 and M1 is set at 1, the threshold might be set where the waveform is higher [20/(20+1)] percent of the time. In this way stray transients can be averaged out. The bandwidth of the statistical detector can be designed to fit the particular use case and the results can be accumulated over a period of time to average out noise. The noise averaged out can include noise of any miss-sampled data over the integration bandwidth of the detector. This can be useful in some circumstances, for example when a phase-locked loop is not locked, particularly when patterns are correctly detected in most instances.

In these and other embodiments of the present invention, multiple patterns can be accumulated in parallel. In this arrangement, when the threshold is adjusted for one pattern it can train to the pattern selected. A second accumulator can be used for a second pattern. In some circumstances, using the same N1 and M1 values might not work properly. Instead, a different increment value N2 and decrement value M2 can be used such that the second accumulator can accumulate in a similar manner as the first accumulator. A comparison of N1/M1 to N2/M2 can show whether the de-emphasis of the second pattern as compared to the first pattern. This information can also be used to converge on a tuned setting for the equalizer with fewer iterations. For example, this process could continue in a loop for several patterns. In these and other embodiments of the present invention, fewer or more accumulators can be used and different algorithms can be used to find relative amplitudes of various patterns with various target criteria.

In some circumstances, it can be advantageous to adjust a waveform provided by a transmitter to the channel. This transmitted waveform adjustment can pre-compensate for non-ideal characteristics of the physical channel, thereby simplifying the equalization task required by the receiver circuits. In these and other embodiments of the present invention, a receiver can provide coefficients, or information that can be used to determine coefficients, for a feed-forward equalizer in the transmitter.

These and other embodiments of the present invention can provide simple and efficient circuits for equalizing a data channel. This can reduce component size, save power, speed design, and improve yields. While examples are shown utilizing binary data, these and other embodiments of the present invention can utilize different numbers of bits, symbols, and different types of symbol, such as three, four, or five level symbols.

Embodiments of the present invention can provide circuits, methods, and apparatus for data reception that can be used in various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. Encoded signals can be transmitted using interface circuits and connector receptacles that can provide pathways for signals and power compliant with various standards such as one of the Universal Serial Bus (USB) standards including USB Type-C, High-Definition Multimedia Interface® (HDMI), Digital Visual Interface (DVI), DisplayPort, Thunderbolt™, Lightning, test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
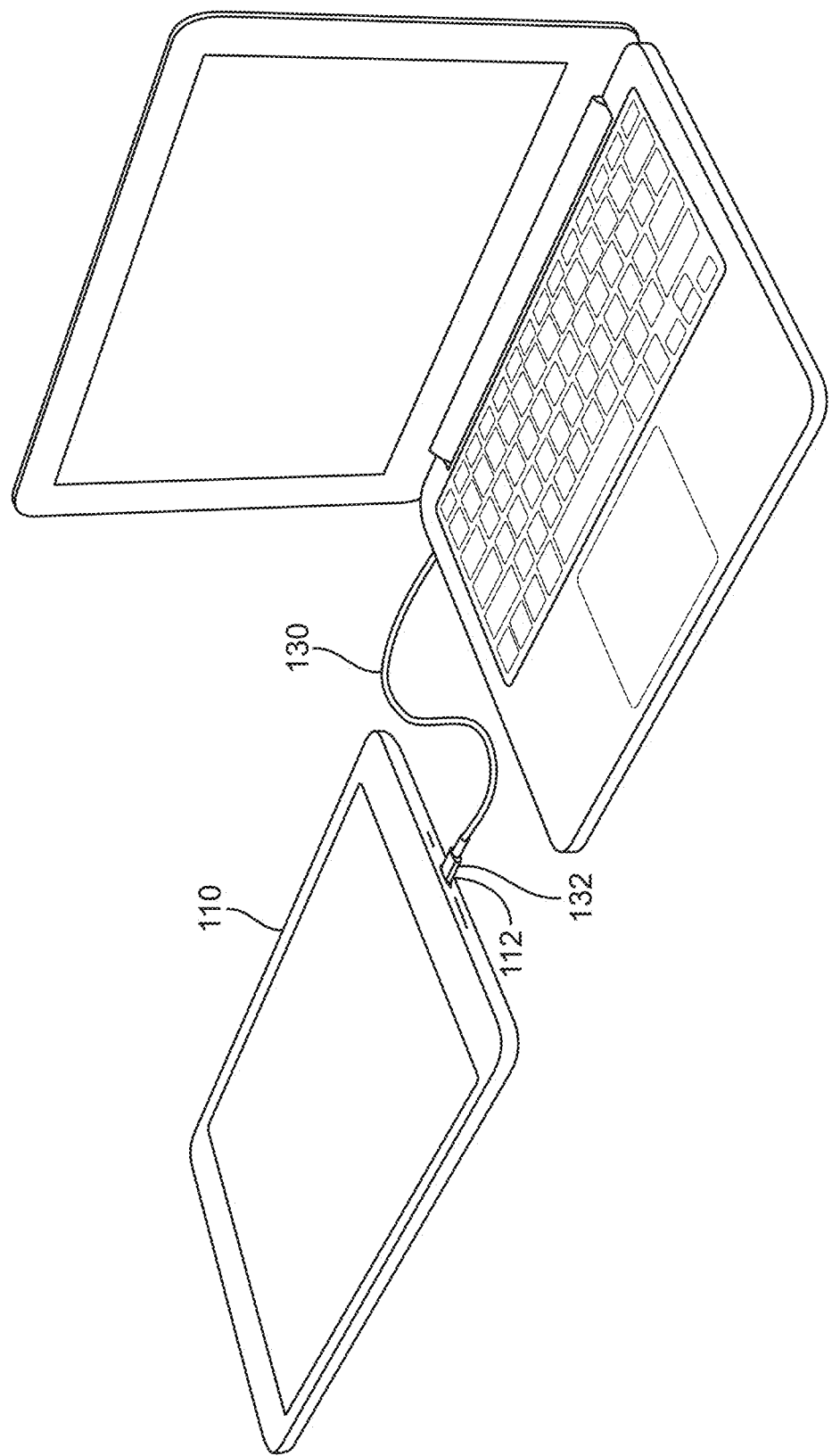
FIG. 1 illustrates an electronic system that can be improved by the incorporation of an embodiment of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

In this example, a first device 110 can be in communication with a second device 120 over a cable 130. Specifically, connector insert 132 on cable 130 can be inserted into connector receptacle 112 on first device 110, while a second connector insert (not shown) can be inserted into a second connector receptacle (not shown) on second device 120. First device 110 and second device 120 can communicate by sending data to each other over cable 130. First device 110 and second device 120 can share power over cable 130 as well.

Data can be transmitted between devices over a combination of a physical channel and an electrical channel. The physical channel can include passive components such as connectors and cable conduits, while the electrical channel can include transmit and receive circuits. The combination of the physical channel and the electrical channel can be referred to as the combined channel.

The physical channel can include connector receptacle 112 and connector insert 132 in first device 110, their counterparts in second device 120, and cable 130. For example, data can be sent from first device 110 to second device 120 over physical channel 220 (shown in FIG. 13.) Specifically, first device 110 can provide data through connector receptacle 112 and associated structures in first device 110, through connector insert 132, to cable 130. Cable 130 can receive the data at first connector insert 132 at a first end of cable 130 and convey the data to the second connector insert at the second end of cable 130. The second connector insert can then pass the data to the connector receptacle and associated structures of second device 120. These various structures can comprise the physical channel 220 used to convey data from first device 110 to second device 120.

The electrical channel can include output or transmitter 210 (shown in FIG. 13) in first device 110 and CTFE 225 in second device 120. CTFE 225 can include various circuits in various embodiments of the present invention.

Physical channel 220 can have a non-uniform or non-linear frequency response that can degrade data reception and cause errors. Accordingly, CTFE 225 in second device 120 can include an equalizer 230 (shown in FIG. 13) or other circuits, such as variable-gain amplifier 240, to compensate for the non-ideal transmitter 210 and physical channel 220. The combination of transmitter 210, physical channel 220, and CTFE 225 can provide a combined channel response that is more consistent and uniform than the frequency response of transmitter 210 and physical channel 220. Further, CTFE 225 can be adjusted such that eye of the received data is optimized for data recovery.

In these and other embodiments of the present invention, test tones can be transmitted by first device 110 and received by second device 120. The test tones can be at discrete frequency, they can be a swept frequency, or they can have other characteristics. The amplitudes of the received test tones can be used to adjust the CTFE 225 ahead of actual data transmission to compensate for the non-ideal characteristics of channel 220. In these and other embodiments of the present invention, the received tones, received data, and other received signals are those tones, data, and other signals that are provided as outputs by CTFE 225 and received by an amplitude detect circuit, such as amplitude detect slicer 264, peak detector 276, or other circuit or combination of circuits. An example of circuitry that can be used to implement this method is shown in the following figure.

Figure 2:
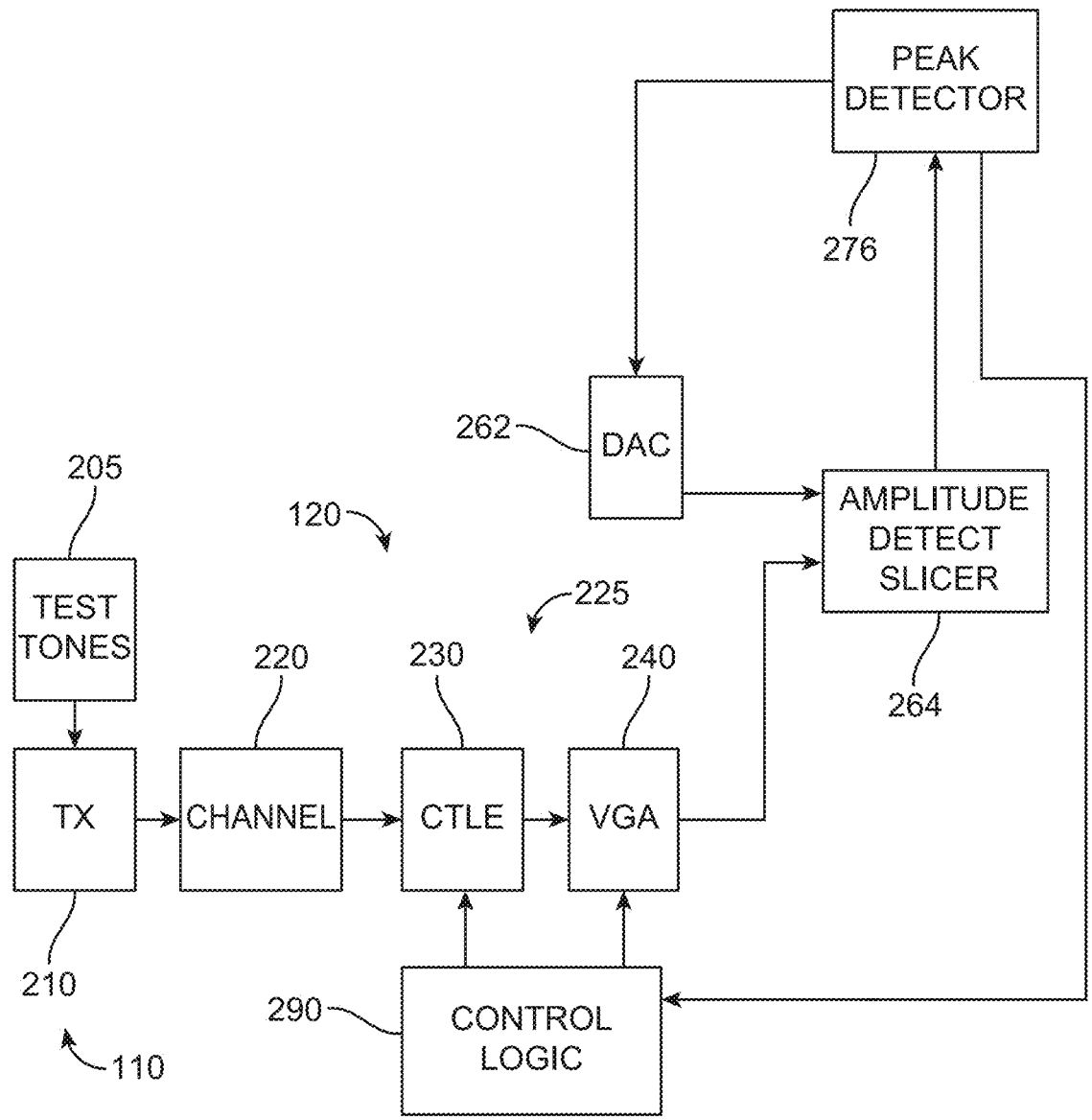
FIG. 2 is a block diagram of a portion of a data path from a first device to a second device according to an embodiment of the present invention.

FIG. 2 is a block diagram of a portion of a data path from a first device to a second device according to an embodiment of the present invention. In this example, transmitter 210 can be located in a first device 110. Transmitter 210 can send test tones 205 through physical channel 220 to receiving circuitry in second device 120. Physical channel 220 can include connector receptacle 112 and associated structures in first device 110, first connector insert 132 and cable 130 (all shown in FIG. 1), as well as a second connector insert and a connector receptacle and associated structures (not shown) of second device 120.

Transmitted test tones can be received by second device 120 by CTFE 225. CTFE 225 can include an equalizer 230. CTFE 225 can further include a variable-gain amplifier 240. CTFE 225 can include either of these and other circuits. Equalizer 230 can be a continuous-time linear equalizer or other type of equalizer. Equalizer 230 can drive variable-gain amplifier 240. CTFE 225 can be adjusted to compensate for non-ideal frequency response characteristics of transmitter 210 and physical channel 220.

The output of CTFE 225 can be received by amplitude detect slicer 264. Amplitude detect slicer 264 can compare a received signal to an output of digital-to-analog converter 262 and provide an output to peak detector 276. Peak detector 276 can provide amplitude information for received signals to control logic 290. Control logic can then adjust or tune equalizer 230 to compensate for non-ideal characteristics of channel 220.

In these and other embodiments of the present invention, one or more characteristics of CTFE 225 can be adjusted to compensate for one or more characteristics of physical channel 220. In these and other embodiments of the present invention, a de-emphasis provided by equalizer 230 and the gain of variable-gain amplifier 240 can be varied, though in these and other embodiments of the present invention, these and other characteristics of these and other circuits can be adjusted. For example, where a high-frequency gain through physical channel 220 is low relative to a low-frequency gain, the de-emphasis of equalizer 230 can be increased compensate. More specifically, a low-frequency gain of equalizer 230 can be lowered while the high-frequency gain near the Nyquist frequency remains somewhat constant, thus relatively increasing the high-frequency gain relative to the low-frequency gain. That is, the de-emphasis provided by equalizer 230 can be increased. Similarly, where a high-frequency gain through physical channel 220 is high relative to a low-frequency gain, the de-emphasis of equalizer 230 can be lowered to compensate by raising the low-frequency gain of equalizer 230. That is, the de-emphasis provided by equalizer 230 can be decreased. Where a gain through physical channel 220 is low, a gain of variable-gain amplifier 240 can be increased compensate. Similarly, where a gain through physical channel 220 is high, the gain of variable-gain amplifier 240 can be decreased to compensate.

In these and other embodiments of the present invention, adjustments to one circuit can be considered when adjusting another circuit. For example, increasing a de-emphasis of equalizer 230 can lower the gain of equalizer 230, which might need to be compensated for by increasing a gain of variable-gain amplifier 240.

The frequency response of the combined channel can be determined in various ways. For example, actual data can be transmitted through the combined channel, and amplitudes of data having specific patterns can be measured. For example, bit patterns having an unchanging level for one, two, three, or other numbers of bit times can be used. Alternatively, test patterns can be transmitted through physical channel 220, where the test patterns are known data patterns. Alternatively, a pseudo-random bit stream, such as a PRBS-11 or other pseudo-random bit stream can be transmitted through physical channel 220. Alternatively, the transmitter 210 can provide a signal having a swept frequency. That is, transmitter 210 can include a phase-locked loop (not shown) that provides an output having a frequency that is swept over a range. Alternatively, test tones at specific frequencies can be transmitted through physical channel 220. In this specific example, test tones can be generated by test tones 205 and transmitted by transmitter 210 in first device 110 over physical channel 220 to CTFE 225 in second device 120. An example of how this can be done is shown in the following figure.

Figure 3:
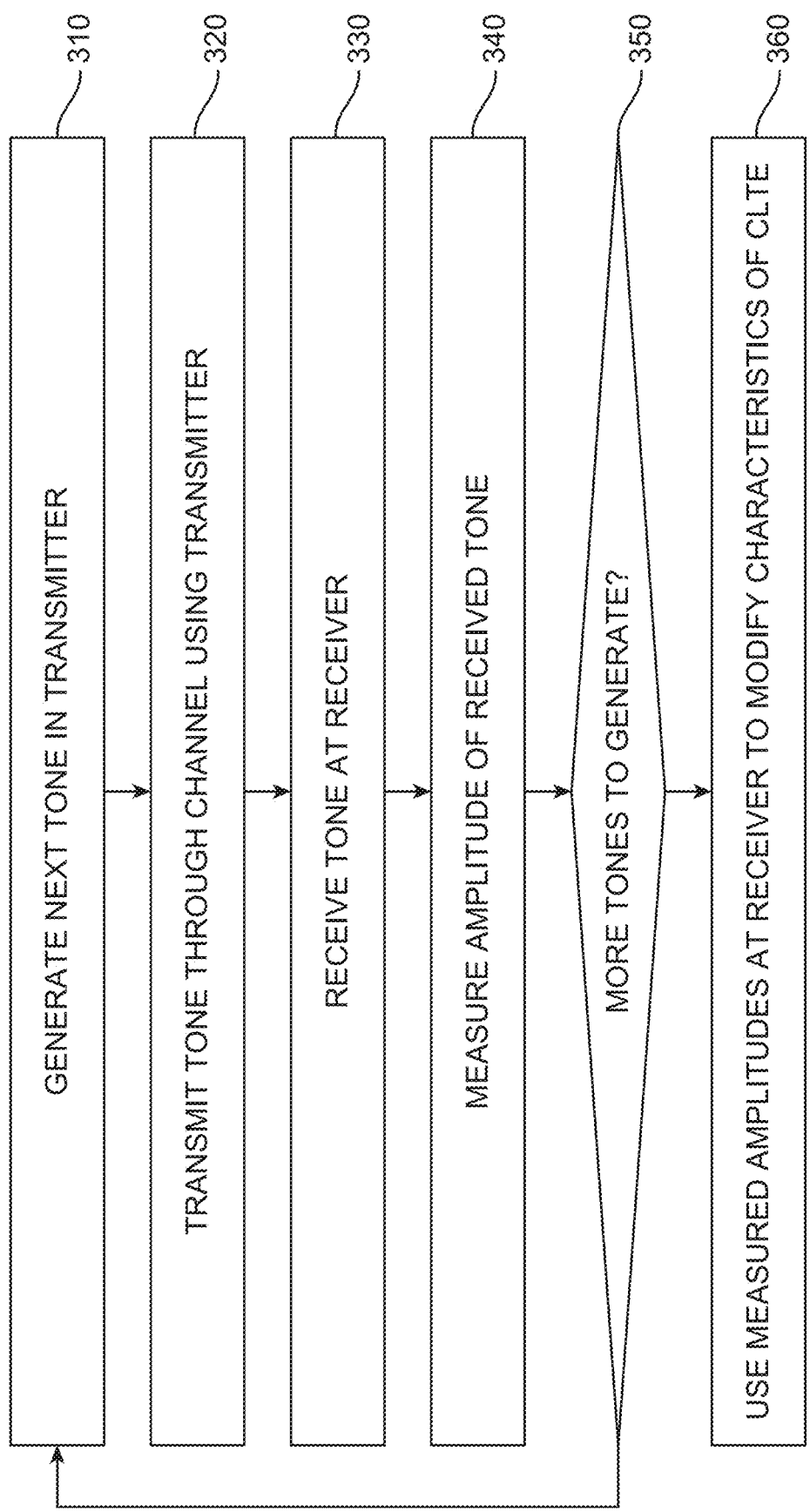
FIG. 3 illustrates a method of determining characteristics of a channel according to an embodiment of the present invention.

FIG. 3 illustrates a method of determining characteristics of a channel according to an embodiment of the present invention. In act 310, a next tone can be generated in a transmitter. This next tone can be a first tone in a sequence, it can be a subsequent tone in sequence, or it can be a single tone. In act 320, the tone can be transmitted through a channel. The tone can be received at a receiver in act 330, for example by an equalizer and variable-gain amplifier. The amplitude of the received tone can be measured in act 340. If there are more tones to generate in act 350, the above sequence of acts can be repeated. The measured amplitudes of the tones received at the receiver can then be used modify characteristics of the equalizer, the variable-gain amplifier, or both. An example is shown in the following figures.

Figure 4:
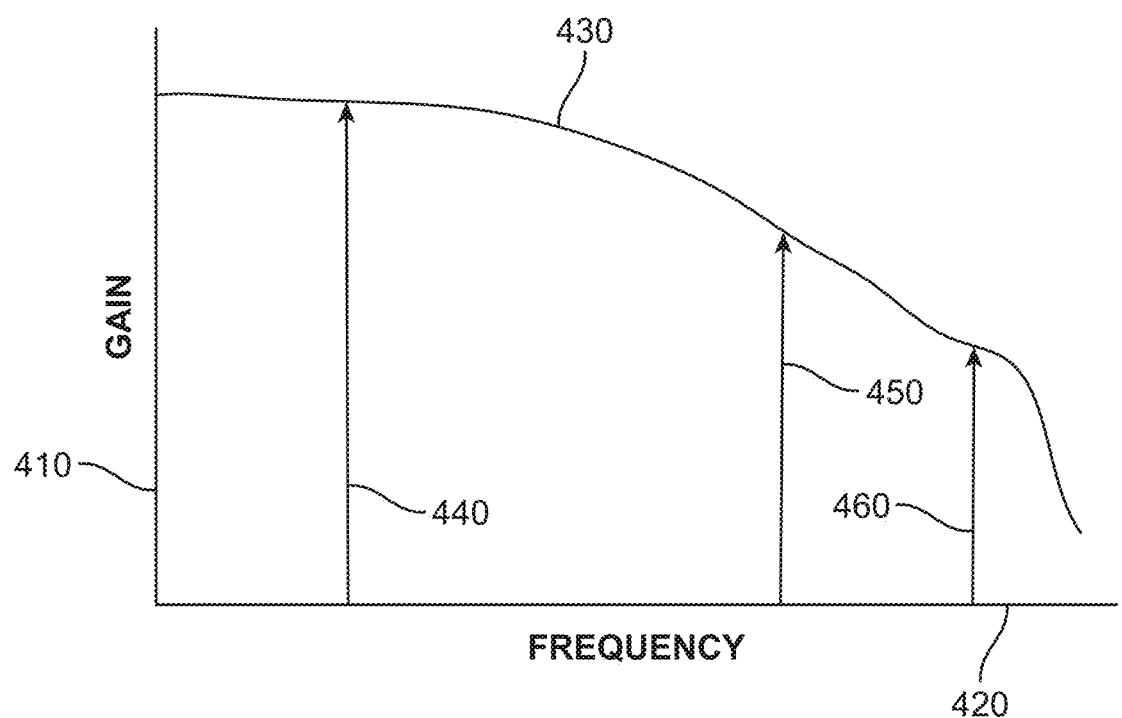
FIG. 4 illustrates a determination of a frequency response of a channel according to an embodiment of the present invention.

FIG. 4 illustrates a determination of a frequency response of a channel according to an embodiment of the present invention. This figure illustrates a gain 410 of the frequency response 430 of a transmitter 210, physical channel 220, and CTFE 225 over frequency 420. In this example, a frequency response 430 of the combined channel can be approximated by a received amplitude for tone 440, a received amplitude for tone 450, and a received amplitude for tone 460. In this example, frequency response 430 exhibits losses at tone 450 and tone 460 as compared to tone 440.

It should be noted that the combined channel frequency response 430 can be a combination of both the frequency response of physical channel 220 and a frequency response of the electrical channel including transmitter 210 and CTFE 225. Accordingly, CTFE 225 can be initially set to have a flat or null frequency response. Alternatively, settings previously provided by control logic 290 can be stored in non-volatile memory and reused. Alternatively, an initial best guess of settings for CTFE 225 can be used. Alternatively, settings at one extreme can be used as initial values. These initial settings can then be modified as necessary using amplitudes of tone 440, tone 450, and tone 460. In this example, three test tones are shown as being used. In these and other embodiments of the present invention, other numbers of tones and their relative frequencies can be used. Again, other patterns of data can be used instead of these tones. For example, bit patterns having an unchanging level for one, two, three, or other numbers of bit times can be used to determine the combined channel frequency response 430.

Figure 5:
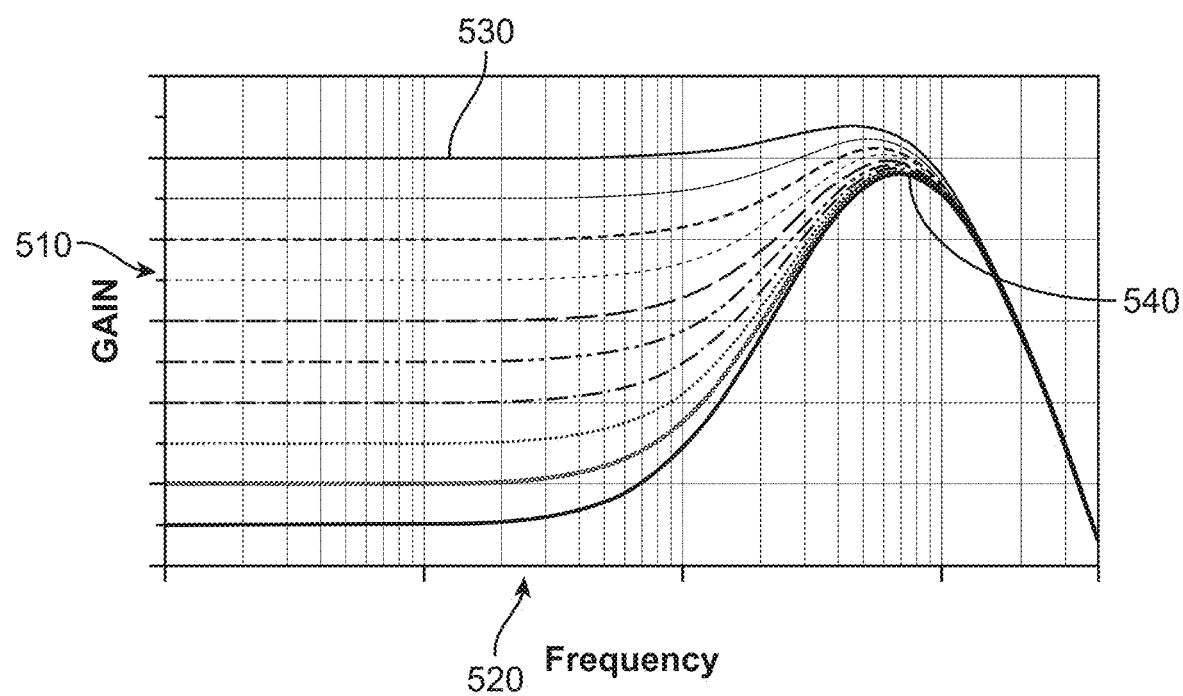
FIG. 5 illustrates characteristics of an equalizer according to an embodiment of the present invention.

FIG. 5 illustrates characteristics of an equalizer according to an embodiment of the present invention. This figure illustrates the frequency response or gain 510 over frequency 520 for an equalizer 230 (shown in FIG. 2) according to an embodiment of the present invention. Equalizer 230 can have a variable low-frequency gain 530. Changes in low-frequency gain 530 can change an amount of de-emphasis provided by equalizer 230. In this example, the de-emphasis can be the difference in gain between the low-frequency gain 530 and the gain at peak 540. In these and other embodiments of the present invention, the high-frequency gain of equalizer 230 can vary near the Nyquist frequency.

Figure 6:
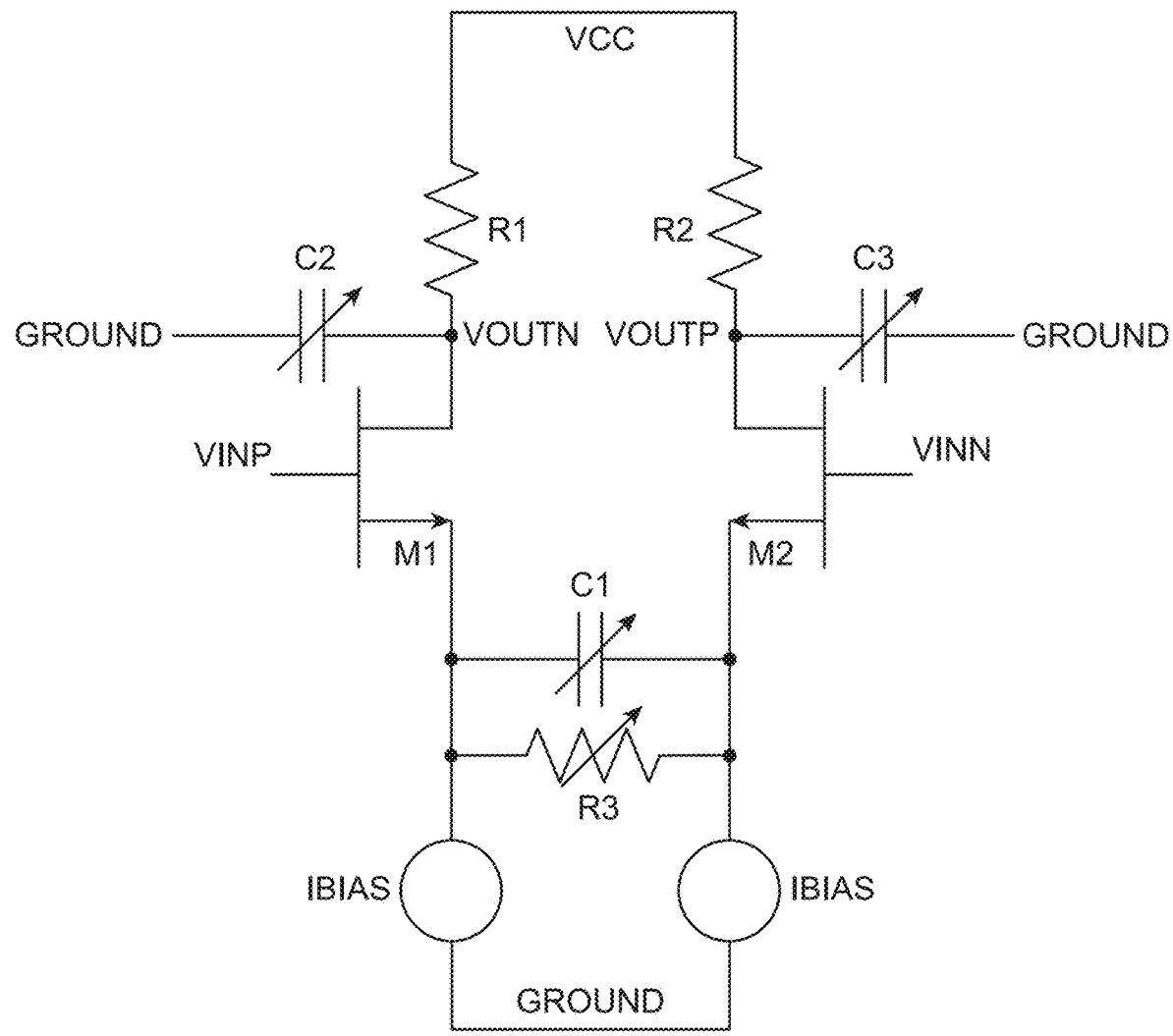
FIG. 6 illustrates a simplified equalizer according to an embodiment of the present invention.

FIG. 6 illustrates a simplified equalizer according to an embodiment of the present invention. This equalizer can be used as at least a portion of equalizer 230 (shown in FIG. 2.) In this example, a differential input signal can be received at inputs VINP and VINN at the gates of transistor M1 and transistor M2. The sources of transistor M1 and transistor M2 can be connected through capacitor C1 and resistor R3. Capacitor C1 and resistor R3 can be variable. Changes in capacitor C1 can change the high-frequency gain of the equalizer. For example, a larger capacitor C1 can reduce the impedance of the C1/R3 network and increase the gain of the equalizer at frequency. Conversely, a smaller capacitor C1 can increase the impedance of the C1/R3 network and decrease the gain of the equalizer at frequency. Changes in resistor R3 can adjust the low-frequency gain 630 of equalizer 230. For example, a larger R3 can reduce the low-frequency gain of the equalizer, while a smaller R3 can increase the gain of the equalizer. C2 and C3 can be used to adjust a high-frequency roll-off of the equalizer. A method of adjusting an equalizer, a variable-gain amplifier, or both, is shown in the following figure.

Figure 7:
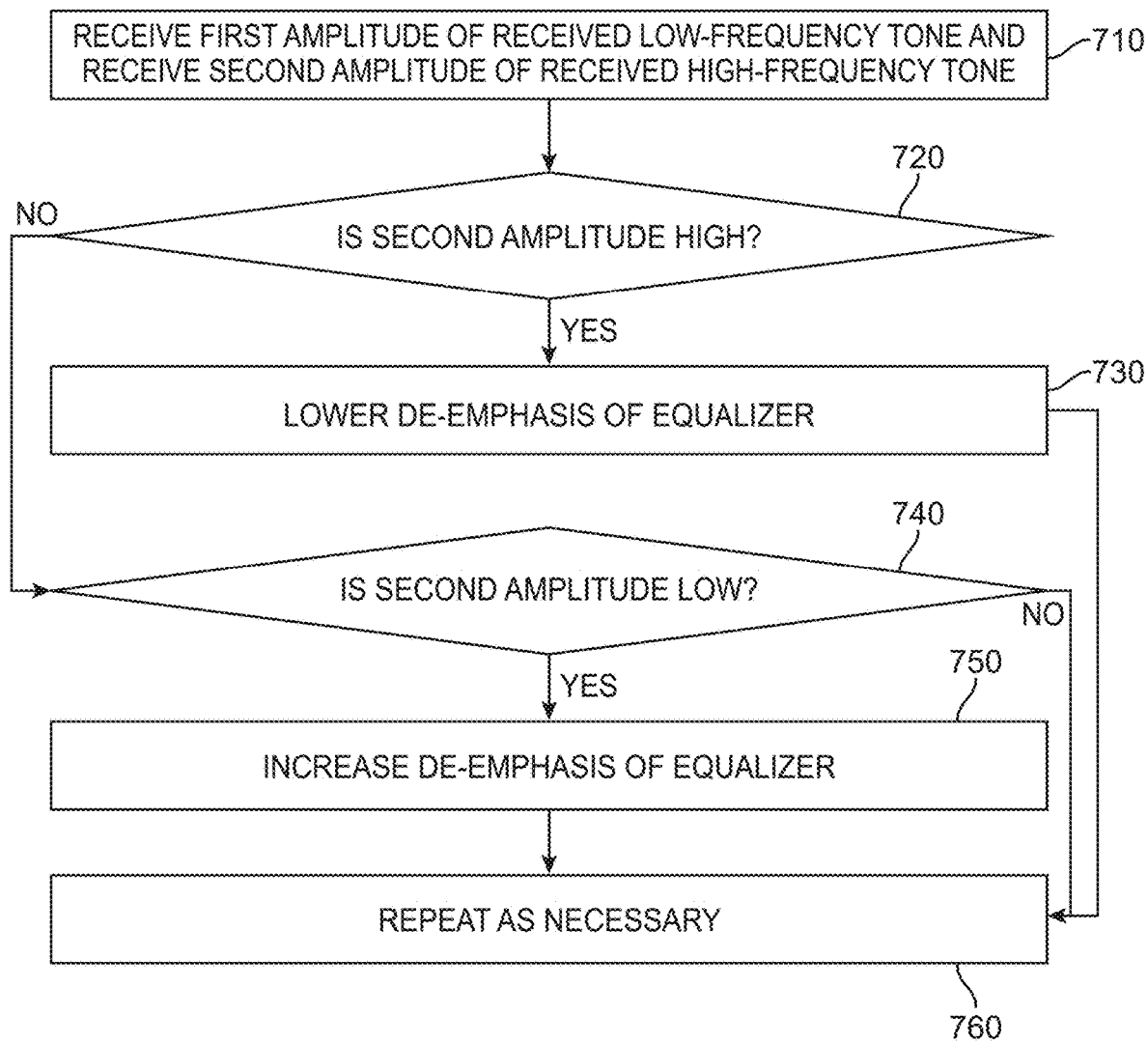
FIG. 7 illustrates a method of adjusting an equalizer and a variable-gain amplifier according to an embodiment of the present invention.

FIG. 7 illustrates a method of adjusting an equalizer and a variable-gain amplifier according to an embodiment of the present invention. In act 710, a first amplitude of a received low-frequency tone and a second amplitude of a received high-frequency tone are received by control logic, such as control logic 290 shown in FIG. 2. In act 720, it is determined whether the second amplitude is excessive. If it is, then the de-emphasis provided by an equalizer can be reduced in act 730. Again, this can be done by increasing a low-frequency gain 530 (shown in FIG. 5) of the equalizer 230 (shown in FIG. 2.) Conversely, if the second amplitude is low, the de-emphasis provided by the equalizer can be increased in act 750. Again, this can be done by decreasing the low-frequency gain 530 of the equalizer. These steps can be repeated as necessary in act 760.

Figure 8:
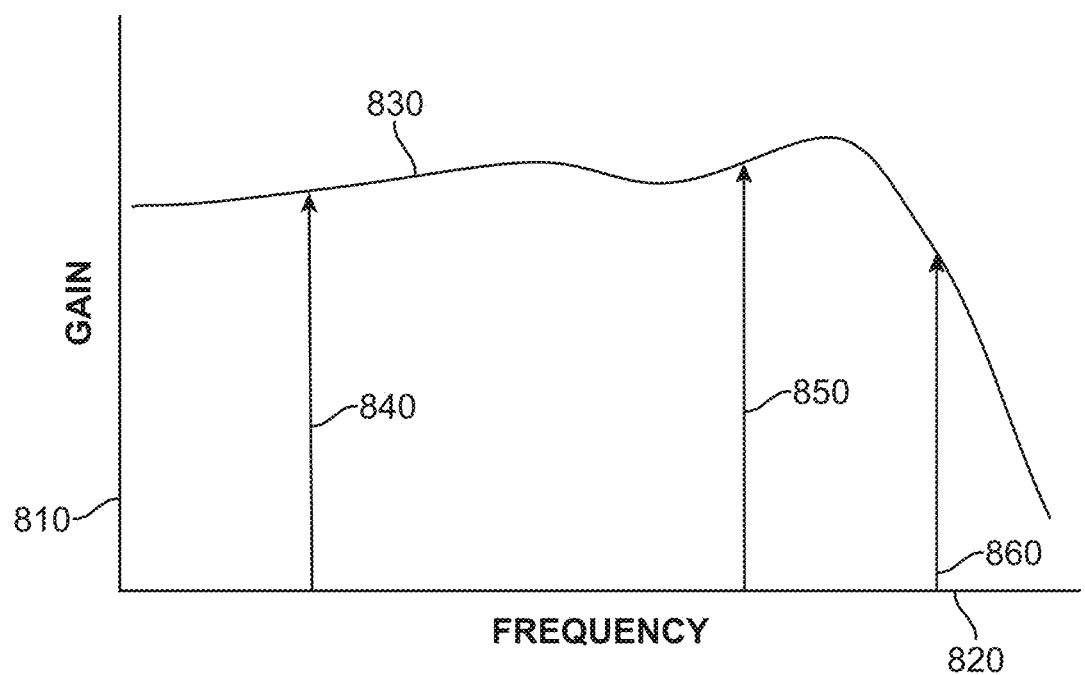
FIG. 8 illustrates an improved channel frequency response according to an embodiment of the present invention.

FIG. 8 illustrates an improved channel frequency response according to an embodiment of the present invention. In this example, a gain 810 of transmitter 210, physical channel 220, and CTFE 225 can be shown as a function of frequency 820. Frequency response 830 can be approximated by amplitudes of tone 840, tone 850, and tone 860.

These and other embodiments of the present invention can make initial adjustments to characteristics of a CTFE in various ways. On occasion, it might be difficult to achieve lock with a phase-locked loop. Accordingly, embodiments of the present invention can provide methods, circuits and apparatus for adjusting a CTFE or other receiver front end before lock is achieved using a phase-locked loop.

Figure 9:
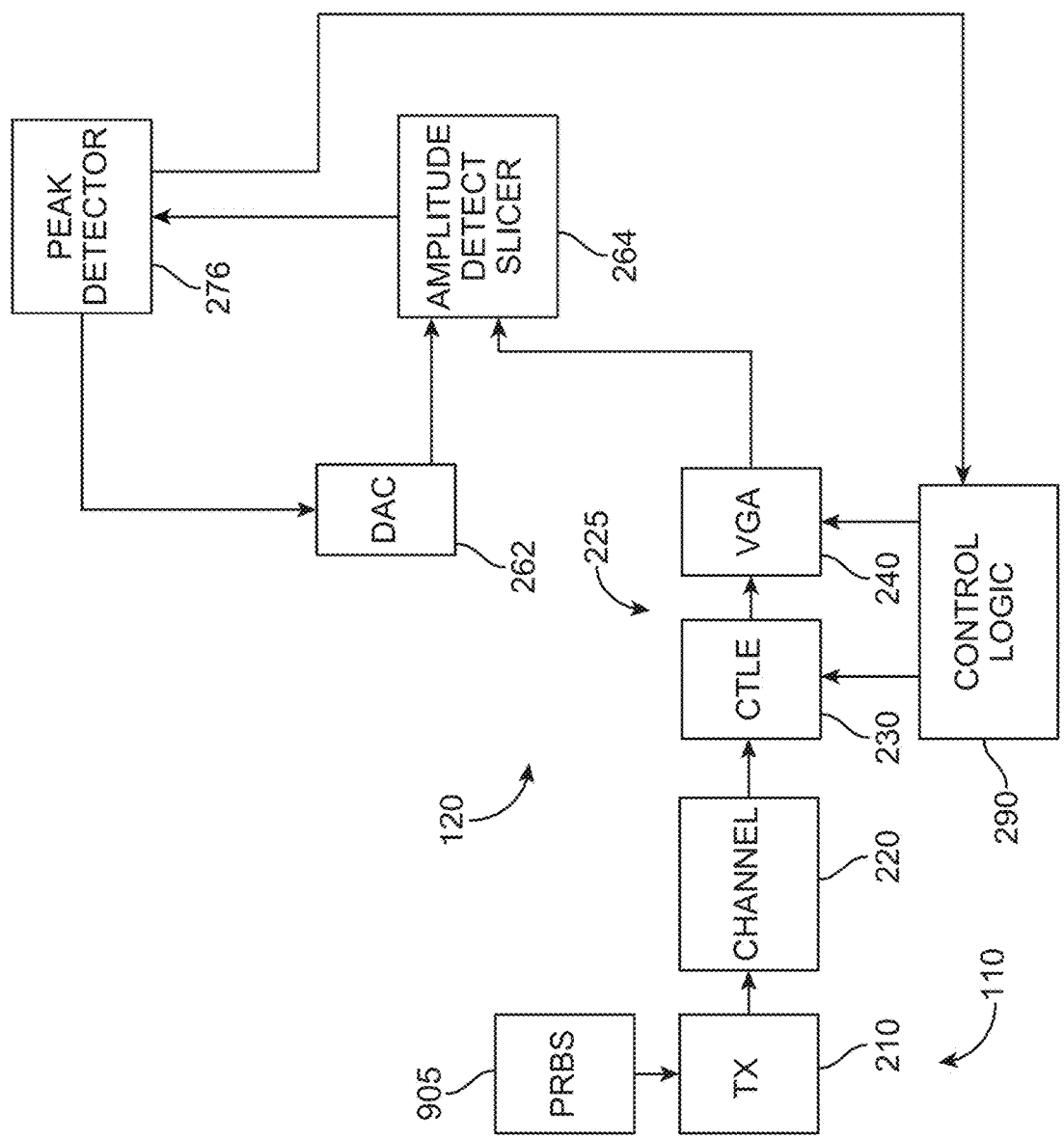
FIG. 9 is a block diagram of circuitry that can be used to adjust a receiver in the absence of a locked phase-locked loop according to an embodiment of the present invention.
Figure 11:
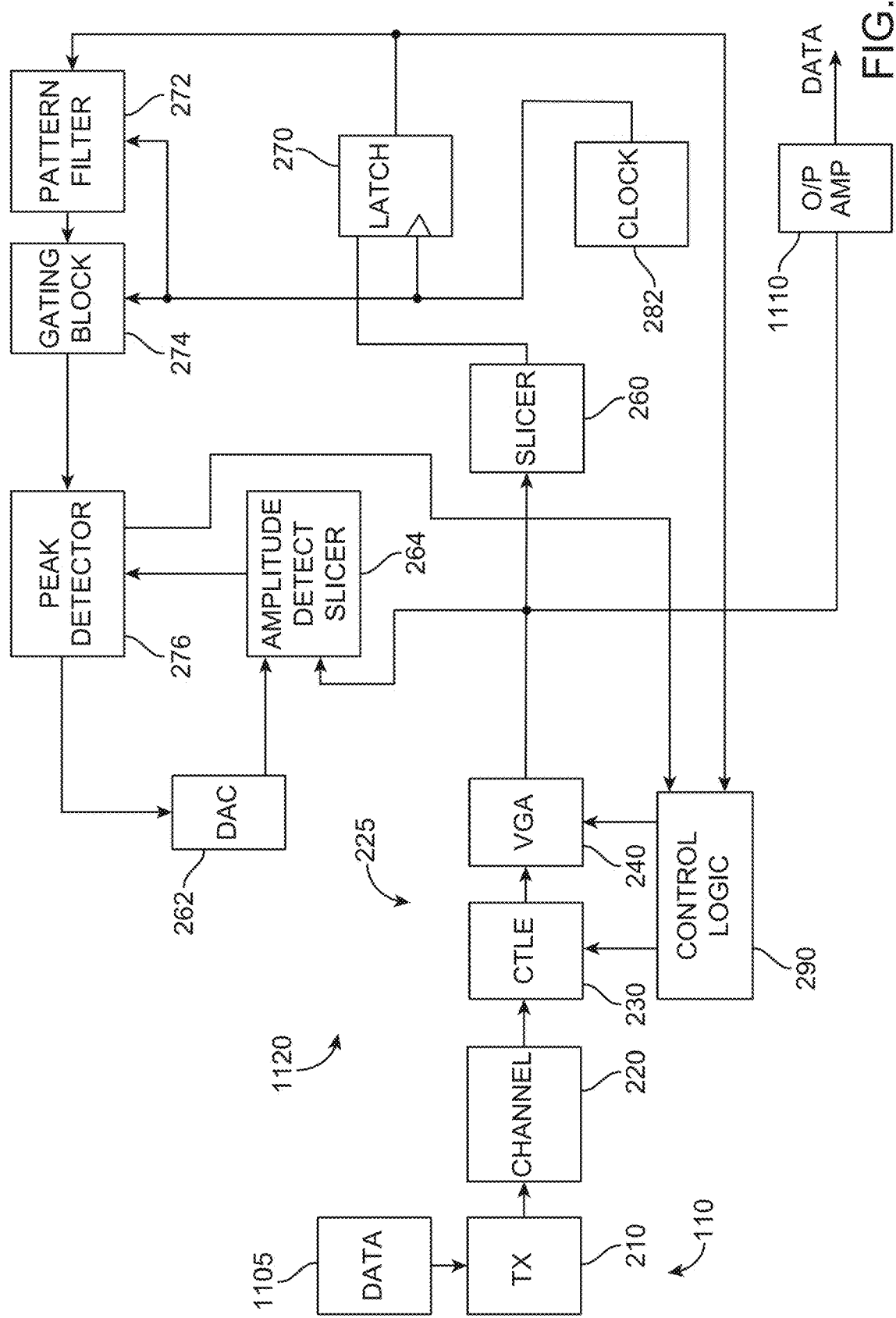
FIG. 11 is a block diagram of a linear redriver according to an embodiment of the present invention.

More specifically, when data is initially received, phase-locked loop 280 (shown in FIG. 13) is likely not yet locked, that is, a clock signal provided by phase-locked loop 280 can have a different frequency, phase, or both, as compared to a clock signal embedded in the received data. In conventional receivers, it can be difficult for phase-locked loop 280 to acquire lock where a generated clock signal has the correct frequency and phase to retime the received data. Accordingly, embodiments of the present invention can adjust a CTFE or other receiver front end such that lock can be more readily acquired by phase-locked loop 280. A block diagram of one such circuit is shown in FIG. 9. Also, as shown in FIG. 11 below, this concept can be extended to circuits that do not include a phase-locked loop 280.

FIG. 9 is a block diagram of circuitry that can be used to adjust a receiver in the absence of a locked phase-locked loop according to an embodiment of the present invention. In this example, transmitter 210 can be located in a first device 110. Transmitter 210 can send data, such as a pseudo-random bit stream 905, through physical channel 220 to receiving circuitry in second device 120. The pseudo-random bit stream can be a PRBS-11 bit stream or other pseudo-random or other bit stream. Physical channel 220 can include connector receptacle 112 and associated structures in first device 110, first connector insert 132 and cable 130 (all shown in FIG. 1), as well as a second connector insert and a connector receptacle and associated structures (not shown) of second device 120.

The transmitted data can be received by second device 120 by CTFE 225. CTFE 225 can include an equalizer 230. CTFE 225 can further include a variable-gain amplifier 240. CTFE 225 can include either of these and other circuits. Equalizer 230 can be a continuous-time linear equalizer or other type of equalizer. Equalizer 230 can drive variable-gain amplifier 240. CTFE 225 can be adjusted to compensate for non-ideal frequency response characteristics of transmitter 210 and physical channel 220.

The output of CTFE 225 can be received by amplitude detect slicer 264. Amplitude detect slicer 264 can compare a received signal to an output of digital-to-analog converter 262 and provide an output to peak detector 276. Peak detector 276 can provide amplitude information for received signals to control logic 290. Control logic can then adjust or tune equalizer 230 and variable-gain amplifier 240 to compensate for non-ideal characteristics of channel 220. After these circuits are adjusted, a phase-locked loop (such as phase-locked loop 280 in FIG. 13) can more readily acquire lock. A method of how this adjustment can be done is shown in the following figure.

Figure 10:
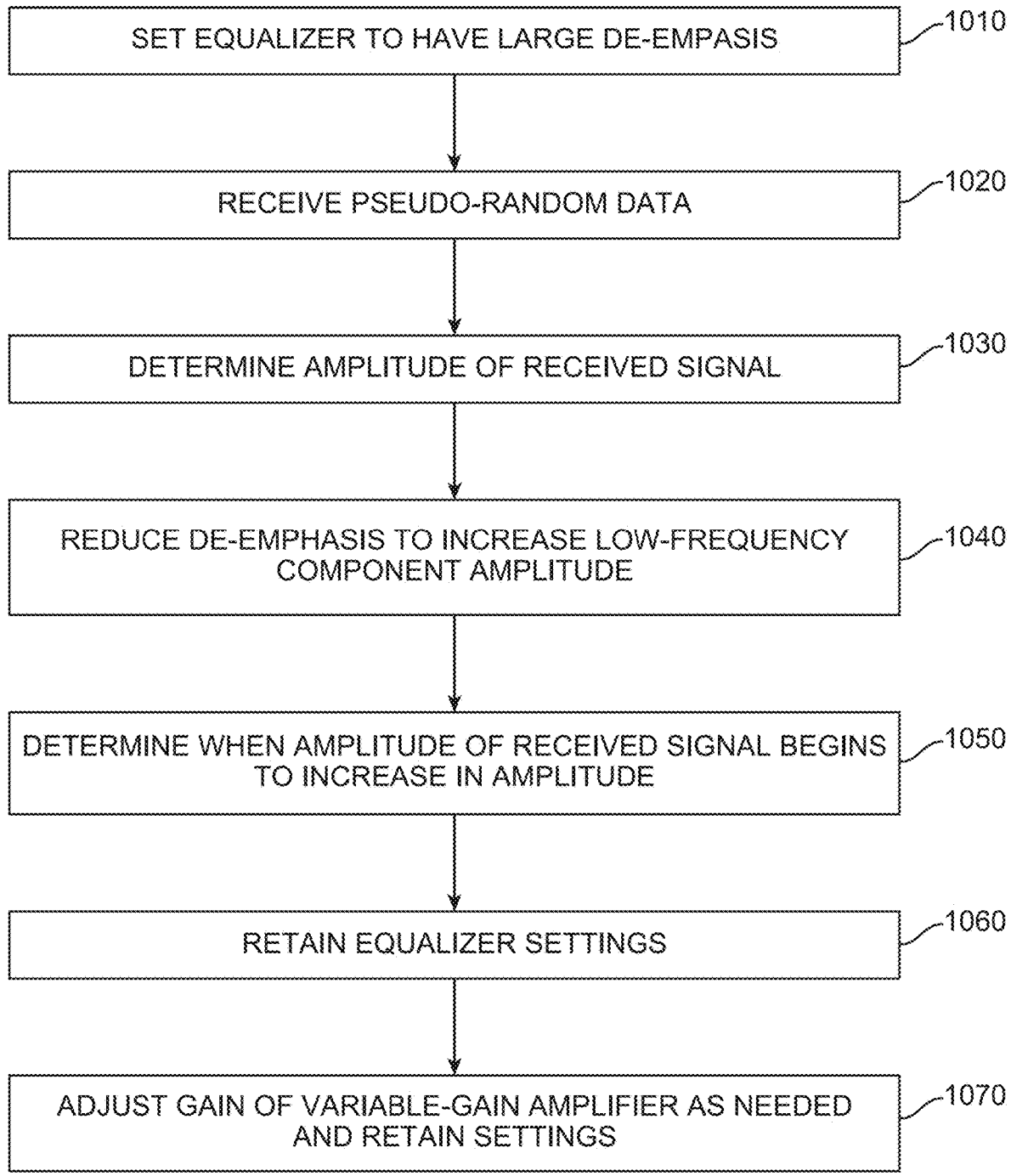
FIG. 10 illustrates a method of adjusting a CTFE without having a locked phase-locked loop according to an embodiment of the present invention.

FIG. 10 illustrates a method of adjusting a CTFE without having a locked phase-locked loop according to an embodiment of the present invention. In act 1010, an equalizer in a CTFE can be set for a high amount of de-emphasis. This can be done by lowering the de-emphasis of the equalizer, or increasing a high-frequency response of the equalizer. At this time, the amplitude of a received signal can be determined by the high-frequency response of the equalizer. In these and other embodiments of the present invention, the received tones, received data, and other received signals are those tones, data, and other signals that are provided as outputs by CTFE 225 and received by an amplitude detect circuit, such as amplitude detect slicer 264, peak detector 276 (all shown in FIG. 9), or other circuit or combination of circuits.

In act 1020, a pseudo-random bit stream can be transmitted by transmitter 210 (shown in FIG. 9) and received by equalizer 230 (shown in FIG. 9.) The amplitude of the received data can be determined in act 1030. The de-emphasis of equalizer 230 can be reduced in act 1040. As the de-emphasis is reduced, the amplitude of the received data can remain constant, then begin to increase, as detected in act 1050. This increase can indicate that the combined channel response is at least approximately equal for high-frequency and low-frequency signal components. At this point the equalizer settings can be retained in act 1060 and used while trying to achieve lock of the phase-locked loop. Alternatively, equalizer setting near these can be retained in act 1060. For example, the equalizer settings used prior to the increase in amplitude detected in act 1050 can be retained in act 1060. This can be used when equalizer settings are changed in steps, where the step before the increase in amplitude is detected are retained. In these and other embodiments of the present invention, the de-emphasis of equalizer 230 can be reduced until the amplitude of the received data reaches a specific ratio to an amplitude of an initial data. In act 1070, the overall gain of the receiver can be adjusted as necessary and the resulting settings can be retained. The settings retained in acts 1060 and 1070 can be used while receiving data, as shown in the following figures. After the de-emphasis of equalizer 230 is adjusted, a phase-locked loop (such as phase-locked loop 280 in FIG. 13) can more readily acquire lock.

The idea of adjusting a CTLE in the absence of a locked phase-locked loop can be extended to circuits that do not include a phase-locked loop. These circuits can include circuits for a cable, repeater, router, hub, or other device. A linear redriver circuit can receive data, equalize the data, and retransmit the data. Since the data is not being retimed by the linear redriver, a clock used for the linear redriver does not need to be synchronized to the incoming data. That is, a phase-locked loop is not required. Instead, a clock at or near the correct frequency can be used. Specific data patterns can be received and their amplitudes can be used to tune an equalizer and related circuits. Since the data patterns are used for equalizer adjustments and not as recovered data, errors in the received data patterns can average out and therefore contribute a negligible amount to the equalizer tuning. A block diagram of one such linear redriver is shown in the following figure.

FIG. 11 is a block diagram of a linear redriver according to an embodiment of the present invention. In this example, transmitter 210 can be located in a first device 110. Transmitter 210 can send data 1105 through physical channel 220 to receiving circuitry 1120 in a plug of cable 130. Physical channel 220 can include connector receptacle 112 and associated structures in first device 110, first connector insert 132 and cable 130 (all shown in FIG. 1), as well as a second connector insert (not shown) of cable 130.

Transmitted data can be received by plug receiving circuitry by CTFE 225. CTFE 225 can include an equalizer 230. CTFE 225 can further include a variable-gain amplifier 240. CTFE 225 can include either of these and other circuits. Equalizer 230 can be a continuous-time linear equalizer or other type of equalizer. Equalizer 230 can drive variable-gain amplifier 240. CTFE 225 can be adjusted to compensate for non-ideal frequency response characteristics of physical channel 220.

The output of CTFE 225 can be received by slicer 260. Slicer 260 can be part of a one-bit slicer. The outputs of slicer 260 can be serially provided to latch 270. Latch 270 can be a set of parallel latches, registers (flip-flops) or other type of circuit that deserializes data from slicer 260. Clock 282 can drive latch 270.

The output of CTFE 225 can be received by amplitude detect slicer 264. Amplitude detect slicer 264 can compare a received signal to an output of digital-to-analog converter 262 and provide an output to peak detector 276. The output of latch 270 can be received by pattern filter 272. When a specific pattern is filtered by pattern filter 272, it can be provided to peak detector 276 via gating block 274. Gating block 274 can be clocked by phase interpolator 266. Phase interpolator 266 can shift the phase of the clock signal generated by phase-locked loop 280 in adjustable increments.

In this way, peak detector 276 can receive amplitude data from amplitude detect slicer 264 and pattern data from pattern filter 272 and gating block 274. This allows peak detector to determine an amplitude for a received data pattern. Peak detector 276 can then provide amplitude information for received signals to control logic 290. Control logic 290 can then adjust or tune equalizer 230 to compensate for non-ideal characteristics of channel 220.

In these and other embodiments of the present invention, one or more characteristics of CTFE 225 can be adjusted to compensate for one or more characteristics of physical channel 220. In these and other embodiments of the present invention, a de-emphasis provided by equalizer 230 and the gain of variable-gain amplifier 240 can be varied, though in these and other embodiments of the present invention, these and other characteristics of these and other circuits can be adjusted. For example, where a high-frequency gain through physical channel 220 is low, the de-emphasis of equalizer 230 can be increased compensate. More specifically, de-emphasis of equalizer 230 can be increased while the high-frequency gain near the Nyquist frequency remains somewhat constant, thus relatively increasing the high-frequency gain as compared to the low-frequency gain. That is, the de-emphasis provided by equalizer 230 can be increased. Similarly, where a high-frequency gain through physical channel 220 is high, a high-frequency gain, or de-emphasis, of equalizer 230 can be decreased to compensate by raising the low-frequency gain of equalizer 230. That is, the de-emphasis provided by equalizer 230 can be decreased. In these and other embodiments of the present invention, the received tones, received data, and other received signals are those tones, data, and other signals that are provided as outputs by CTFE 225 and received by an amplitude detect circuit, such as amplitude detect slicer 264, peak detector 276, or other circuit or combination of circuits.

Variable-gain amplifier 240 can be used to vary an amplitude of a received signal output by CTFE 225. For example, where a low-frequency gain through physical channel 220 is low, a gain of variable-gain amplifier 240 can be increased compensate. Similarly, where a low-frequency gain through physical channel 220 is high, the gain of variable-gain amplifier 240 can be decreased to compensate. This can be accomplished in various ways. For example, in these and other embodiments of the present invention, when a gain of variable-gain amplifier 240 is excessive, the output of variable-gain amplifier 240 can begin to compress. This can cause the output response of variable-gain amplifier 240 to become non-linear. Accordingly, control logic 290 can provide a first gain setting to variable-gain amplifier 240. A first amplitude of a received waveform at the output of variable-gain amplifier 240 can be determined, for example by amplitude detect slicer 264 and peak detector 276. Control logic 290 can then provide a second gain setting to variable-gain amplifier 240. A second amplitude of a received waveform at the output of variable-gain amplifier 240 can be determined as before. A metric, such as the difference between the first amplitude and the second amplitude, a ratio of the second amplitude and the first amplitude, a ratio of the first amplitude and the second amplitude, or other metric can be used to determine whether variable-gain amplifier 240 is in compression. For example, if a difference between the first amplitude and the second amplitude is smaller than expected, variable-gain amplifier 240 can be determined to be in compression. When variable-gain amplifier 240 is found to be in compression, the gain of variable-gain amplifier 240 can be reduced. When variable-gain amplifier 240 is found to not be in compression, the gain of variable-gain amplifier 240 can be further increased. In this way, a setting for the gain of variable-gain amplifier 240 that is near, but below the gain where compression occurs, can be determined and used for further data reception. In these and other embodiments of the present invention, this gain setting can be determined using low-frequency data.

In these and other embodiments of the present invention, adjustments to one circuit can be considered when adjusting another circuit. For example, increasing a de-emphasis of equalizer 230 can lower the gain of equalizer 230, which might need to be compensated for by increasing a gain of variable-gain amplifier 240.

Figure 12:
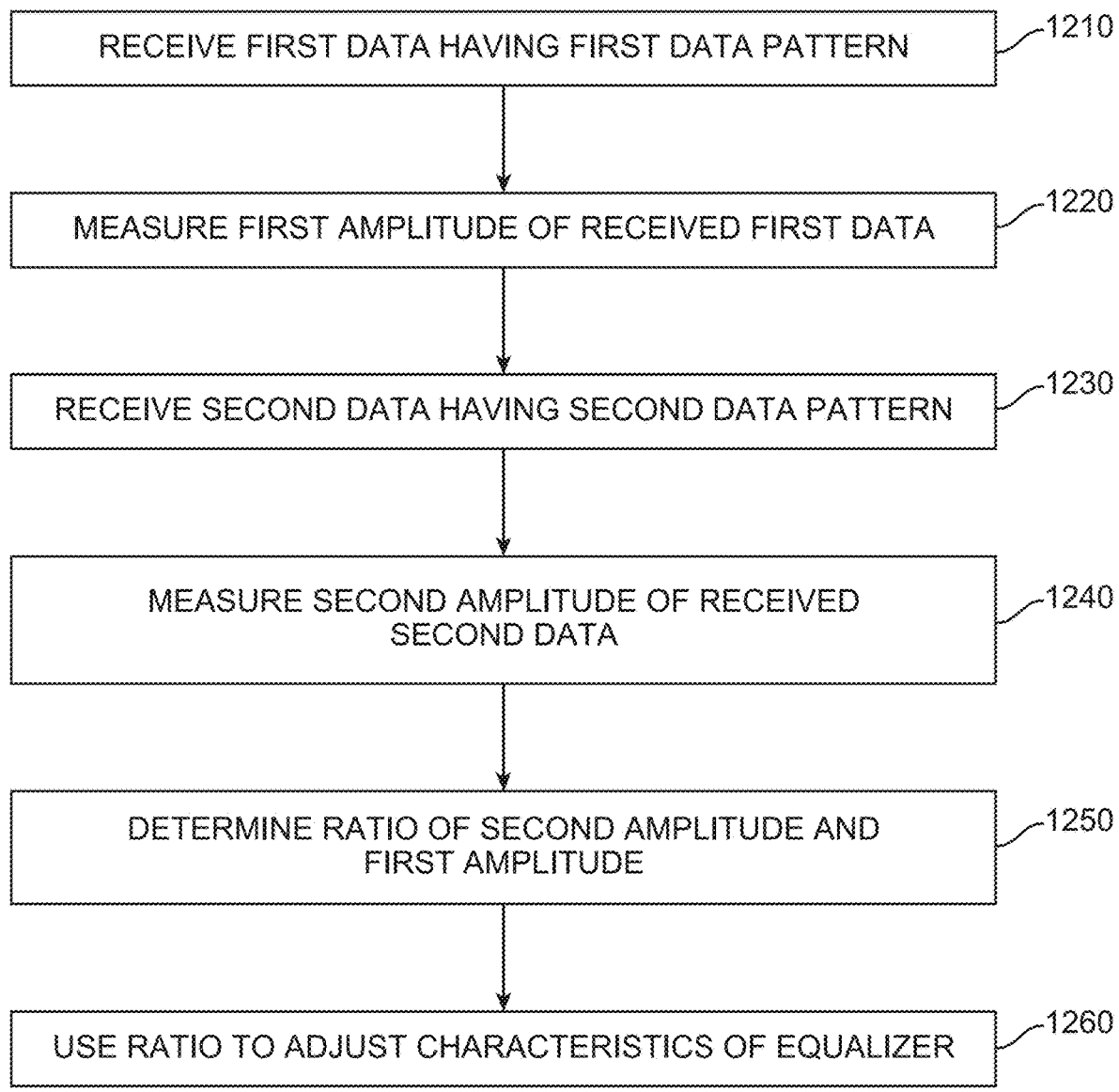
FIG. 12 illustrates a method of adjusting a CTFE according to an embodiment of the present invention.

FIG. 12 illustrates a method of adjusting a CTFE according to an embodiment of the present invention. In act 1210, first data having a first data pattern can be received. A first amplitude of the received first data can be measured in act 1220. In act 1230, second data having a second data pattern can be received. A second amplitude of the received second data can be measured in act 1240. In act 1250, a ratio of the second amplitude and the first amplitude can be determined. From this information, characteristics of circuits in a CTFE 225, such as equalizer 230 (shown in FIG. 11), can be adjusted in act 1260.

In these and other embodiments of the present invention, the amplitude of the received first data and received second data can be determined in various ways. For example, pattern filter 272 can detect low-frequency data patterns, such as the 100/011 patterns, the 1000/0111 patterns, or other such patterns. Once such patterns are detected, amplitude detect slicer 264 can detect a voltage difference between the 100 pattern and 011 pattern, or the 1000 pattern and 0111 pattern, or other such patterns, and store the difference as the first amplitude. Similarly, pattern filter 272 can detect low-frequency data patterns, such as the 010/101 patterns. Once these patterns are detected, amplitude detect slicer 264 can detect a voltage difference between the patterns and store the difference as the second amplitude. In these and other embodiments of the present invention, other data patterns can be used for the low-frequency first data pattern and the high-frequency second data pattern.

As before, the combined channel frequency response can be a combination of both the frequency response of physical channel 220 and a frequency response of the electrical channel including CTFE 225 (all shown in FIG. 11.) Accordingly, CTFE 225 can be initially set to have a flat or null frequency response. Alternatively, settings previously provided by control logic 290 (also shown in FIG. 11) can be stored in nonvolatile memory and reused. Alternatively, an initial best guess of settings for CTFE 225 can be used. Alternatively, settings at one extreme can be used as initial values. Alternatively, settings found while locking a phase-locked loop using a method such as the method shown in FIG. 10 can be used. These initial settings can then be modified as necessary using the received amplitudes and ratios thereof. In this example, two amplitudes, or an amplitude and a ratio of two amplitudes, are shown as being used. In these and other embodiments of the present invention, other numbers of amplitudes and ratios can be used.

In these and other embodiments of the present invention, data patterns containing data at different frequencies can be used. For example, the first data can have a relatively low frequency, for example the Nyquist frequency divided by three. The second data can have a relatively high frequency, such as the Nyquist frequency or the Nyquist frequency divided by two. Using these data patterns can provide an indication of the step response of the combined channel at different frequencies. The data can be part of a training sequence or pattern or it can be actual data received by second device 120 (shown in FIG. 11.) The data can be pseudo-random bit stream data, such as PRBS-11 or other pseudo-random bit stream data. An example of received data that can be used to adjust a CTFE is shown in the following figure.

Figure 13:
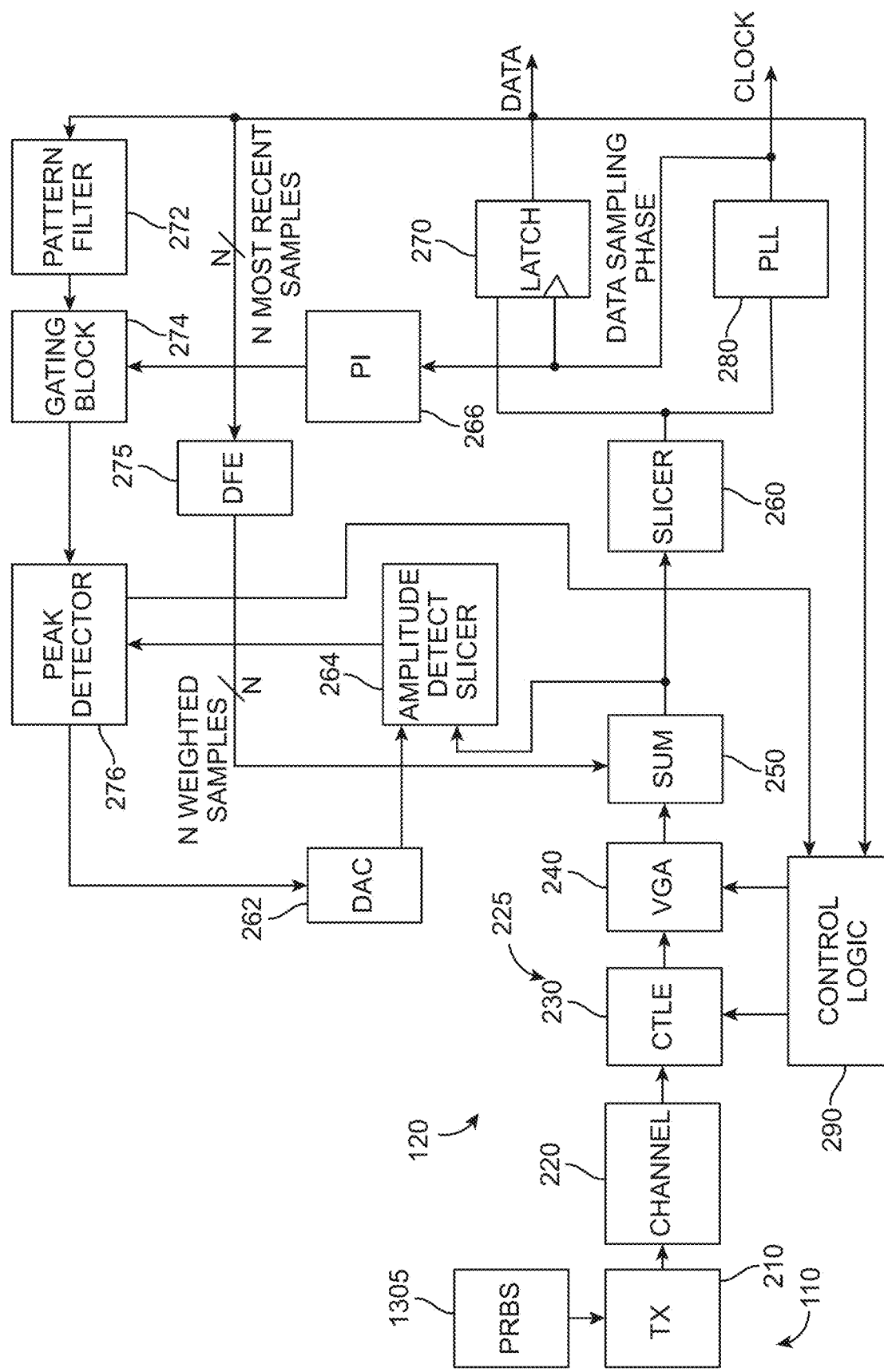
FIG. 13 is a block diagram for a data path from a first device to a second device according to an embodiment of the present invention.

Again, in these and other embodiments of the present invention, data can be transmitted by transmitter 210 (shown in FIG. 13) through physical channel 220 (shown in FIG. 13), and received by CTFE 225 (shown in FIG. 13.) Patterns in the received data can be recognized and their amplitudes can be used in adjusting equalizer 230 (shown in FIG. 13) or other circuits in CTFE 225. An example is shown in the following figure.

FIG. 13 is a block diagram for a data path from a first device to a second device according to an embodiment of the present invention. In this example, transmitter 210 can be located in a first device 110. Transmitter 210 can send data through physical channel 220 to receiving circuitry in second device 120. Physical channel 220 can include connector receptacle 112 and associated structures in first device 110, first connector insert 132 and cable 130 (all shown in FIG. 1), as well as a second connector insert and a connector receptacle and associated structures (not shown) of second device 120.

Transmitted data 1305 can be received by second device 120 by CTFE 225. The data can be part of a training sequence or pattern or it can be actual data received by second device 120. The data can be pseudo-random bit stream data, such as PRBS-11 or other pseudo-random bit stream data. CTFE 225 can include an equalizer 230. CTFE 225 can further include a variable-gain amplifier 240. CTFE 225 can include either of these and other circuits. Equalizer 230 can be a continuous-time linear equalizer or other type of equalizer. Equalizer 230 can drive variable-gain amplifier 240. CTFE 225 can be adjusted to compensate for non-ideal frequency response characteristics of transmitter 210 and physical channel 220.

The output of CTFE 225 can be received by summing node 250. The output of summing node 250 can be sampled by slicer 260. Slicer 260 can be part of a one-bit slicer. The outputs of slicer 260 can be serially provided to latch 270. Latch 270 can be a set of parallel latches, registers (flip-flops) or other type of circuit that deserializes data from slicer 260. Data from slicer 260 can drive phase-locked loop 280. Data from latch 270 can also be provided to decision-feedback equalizer (DFE) 275, the output of which can be added to the output of variable-gain amplifier 240 by summing node 250. DFE 275 can multiply the data output by latch 270 with tap-weight coefficients trained to optimize eye metric, such as eye width or eye height. Phase-locked loop 280 can provide the clock output and can drive latch 270. The recovered data can then be decoded as necessary.

The output of CTFE 225 can be received by amplitude detect slicer 264. Amplitude detect slicer 264 can compare a received signal to an output of digital-to-analog converter 262 and provide an output to peak detector 276. The output of latch 270 can be received by pattern filter 272. When a specific pattern is filtered by pattern filter 272, it can be provided to peak detector 276 via gating block 274. Gating block 274 can be clocked by phase interpolator 266. Phase interpolator 266 can shift the phase of the clock signal generated by phase-locked loop 280 in adjustable increments.

In this way, peak detector 276 can receive amplitude data from amplitude detect slicer 264 and pattern data from pattern filter 272 and gating block 274. This allows peak detector to determine an amplitude for a received data pattern. Peak detector 276 can then provide amplitude information for received signals to control logic 290. Control logic 290 can then adjust or tune equalizer 230 to compensate for non-ideal characteristics of channel 220.

The output of summing node 250 can be sensed for its peak-to-peak variation, which can then be provided to control logic 290. Control logic 290 can receive amplitudes of DFE coefficient taps and then use the recovered data amplitudes to adjust CTFE 225. The adjusted CTFE 225 can then compensate for non-uniform or non-linear characteristics of transmitter 210 and physical channel 220.

This configuration can employ two slicers that can be used in recovering data and the clock. For example, slicer 260 can be a data slicer that provides a quantized voltage level of the output of summing node 250. Phase-locked loop 280 can provide a clock signal to clock decisions made by slicer 260 into latch 270. In these and other embodiments of the present invention, other methods and circuits of clock and data recovery can be used.

More specifically, two slicers 260 can be used. A first slicer can be used to sample a rising edge for phase-locked loop 280 to use as a tracking edge when logic passes the results of that slicing edge event to the tracking circuits of phase-locked loop 280 for processing. A second slicer can be used for rising data and a falling edge of the clock signal phase-locked loop 280. Pattern filter 272 can be gated by gating block 274 and used to determine clock and data for a given sample. In these and other embodiments, the determination of a clock is used when a data transition is near full scale, for example where the pattern is a 0011, 1100, or other low-frequency transition.

This configuration can employ two feedback loops for tuning and adjusting circuitry in the receive circuitry of second device 120. The first loop can be include an output of summing node 250, through peak-to-peak detector 276 to control logic 290, where adjustments can be made to CTFE 225. New data can then pass through CTFE 225 to summing node 250.

The second loop can be through summing node 250 and slicer 260. The outputs of slicer 260 can be deserialized by latch 270, which can provide outputs to DFE 275. DFE 275 can multiply these outputs by DFE coefficient weighting factors trained over time to optimize the received eye diagram, and then the multiply accumulator convolution of DFE coefficients and serial samples can be summed and provided to summing node 250. The output of DFE and the output of CTFE 225 can be combined by summing node 250.

These two feedback loops can have different loop bandwidths to avoid oscillations. For example, the first feedback loop through control logic 290 can be much slower, or have a much lower bandwidth, than the second feedback loop through DFE 275. That is, the DFE can be much faster than the equalizer 230 and the DFE coefficients can be used to train the equalizer 230 to desired targets.

More specifically, the initial tuning of CTFE 225 prior to lock can be done with the first loop including peak detector 276. After phase lock of phase-locked loop 280 has been achieved and DFE 275 is operational, CTFE 225 can be tuned using other criteria such as adjusting DFE tap weight goals of various taps, for a more refined equalized state. CTFE 225 can be adjusted to keep DFE coefficients inside their design target magnitude ranges, such as having higher order terms trend to zero. Other techniques can be used such that beyond the range of the DFE taps the channel can be well-compensated by the CTLE settings. That is, the initial tuning of CTFE 225 can be done with phase-locked loop 280, while operational or run-time training can be done through DFE 275.

The above circuits can be implemented in various ways in various embodiments of the present invention. For example, peak-to-peak detector 285 can be implemented as an accumulator that drives a peak-to-peak detect circuit. The accumulator can be arranged to filter out rare events to improve the accuracy of the peak-detect circuit. Also, while a single data path running at full speed and recovering each sequential bit is shown, two such paths can operate in parallel on even and odd data. That is the two paths can be toggled to reduce the operating speed of each path.

In these and other embodiments of the present invention, one or more characteristics of CTFE 225 can be adjusted to compensate for one or more characteristics of physical channel 220. In these and other embodiments of the present invention, a de-emphasis provided by equalizer 230 can be varied, though in these and other embodiments of the present invention, these and other characteristics of these and other circuits can be adjusted. For example, where a high-frequency gain through physical channel 220 is low, the de-emphasis of equalizer 230 can be increased compensate. More specifically, de-emphasis of equalizer 230 can be increased while the high-frequency gain near the Nyquist frequency remains somewhat constant, thus relatively increasing the high-frequency gain relative to the low-frequency gain. That is, the de-emphasis provided by equalizer 230 can be increased. Similarly, where a high-frequency gain through physical channel 220 is high, a high-frequency gain, or de-emphasis, of equalizer 230 can be decreased to compensate by raising the low-frequency gain of equalizer 230. That is, the de-emphasis provided by equalizer 230 can be decreased.

Variable-gain amplifier 240 can be used to vary an amplitude of a received signal output by CTFE 225. For example, where a low-frequency gain through physical channel 220 is low, a gain of variable-gain amplifier 240 can be increased compensate. Similarly, where a low-frequency gain through physical channel 220 is high, the gain of variable-gain amplifier 240 can be decreased to compensate. This can be accomplished in various ways. For example, in these and other embodiments of the present invention, when a gain of variable-gain amplifier 240 is excessive, the output of variable-gain amplifier 240 can begin to compress. This can cause the output response of variable-gain amplifier 240 to become non-linear. Accordingly, control logic 290 can provide a first gain setting to variable-gain amplifier 240. A first amplitude of a received waveform at the output of variable-gain amplifier 240 can be determined, for example by amplitude detect slicer 264 and peak detector 276. Control logic 290 can then provide a second gain setting to variable-gain amplifier 240. A second amplitude of a received waveform at the output of variable-gain amplifier 240 can be determined as before. A metric, such as the difference between the first amplitude and the second amplitude, a ratio of the second amplitude and the first amplitude, a ratio of the first amplitude and the second amplitude, or other metric can be used to determine whether variable-gain amplifier 240 is in compression. For example, if a difference between the first amplitude and the second amplitude is smaller than expected, variable-gain amplifier 240 can be determined to be in compression. When variable-gain amplifier 240 is found to be in compression, the gain of variable-gain amplifier 240 can be reduced. When variable-gain amplifier 240 is found to not be in compression, the gain of variable-gain amplifier 240 can be further increased. In this way, a setting for the gain of variable-gain amplifier 240 that is near, but below the gain where compression occurs, can be determined and used for further data reception. In these and other embodiments of the present invention, this gain setting can be determined using low-frequency data.

In these and other embodiments of the present invention, adjustments to one circuit can be considered when adjusting another circuit. For example, increasing a de-emphasis of equalizer 230 can lower the gain of equalizer 230, which might need to be compensated for by increasing a gain of variable-gain amplifier 240.

Again, in these and other embodiments of the present invention, data can be transmitted by transmitter 210 (shown in FIG. 11) through physical channel 220 (shown in FIG. 11), and received by CTFE 225 (shown in FIG. 11.) Patterns in the received data can be recognized and their amplitudes can be used in adjusting equalizer 230 and variable-gain amplifier 240 (shown in FIG. 11) or other circuits in CTFE 225. An example is shown in the following figure.

Figure 14:
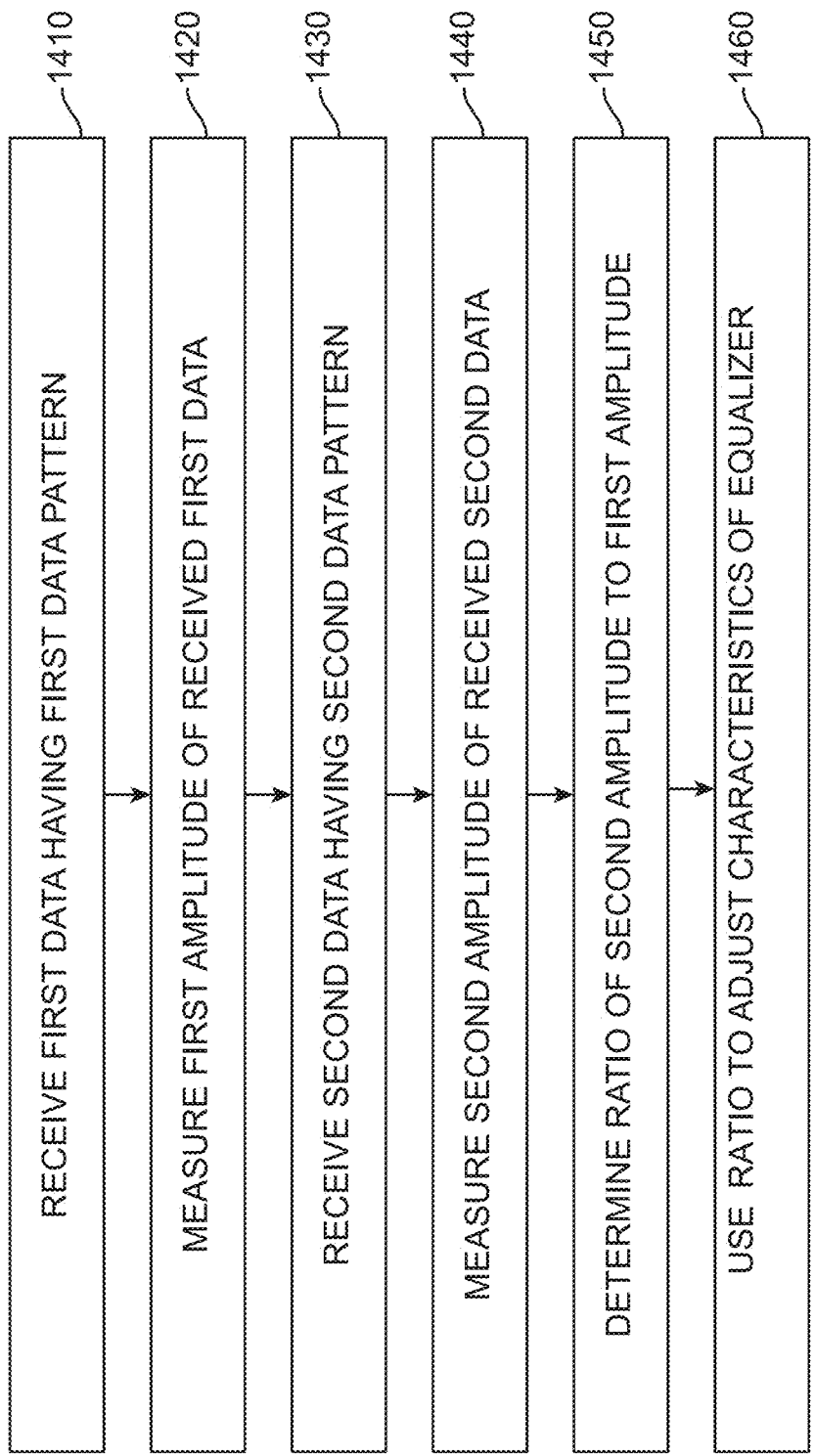
FIG. 14 illustrates a method of adjusting a CTFE according to an embodiment of the present invention.

FIG. 14 illustrates a method of adjusting a CTFE according to an embodiment of the present invention. In act 1410, first data having a first data pattern can be received. A first amplitude of the received first data can be measured in act 1420. In act 1430, second data having a second data pattern can be received. A second amplitude of the received second data can be measured in act 1440. In act 1450, a ratio of the second amplitude and the first amplitude can be determined. From this information, characteristics of circuits in a CTFE 225, such as an equalizer 230 (shown in FIG. 32), can be adjusted in act 1460. In these and other embodiments of the present invention, the received tones, received data, and other received signals are those tones, data, and other signals that are provided as outputs by CTFE 225 and received by an amplitude detect circuit, such as amplitude detect slicer 264, peak detector 276, or other circuit or combination of circuits.

In these and other embodiments of the present invention, the amplitude of the received first data and received second data can be done in various ways. For example, pattern filter 272 can detect a low-frequency data pattern, such as the 01110 or 10001 patterns. Once such a pattern is detected, amplitude detect slicer 264 can detect a voltage difference between the 01110 and 10001 patterns and store the difference as the first amplitude. Similarly, pattern filter 272 can detect a low-frequency data pattern, such as the 010 or 101 patterns. Once such a pattern is detected, amplitude detect slicer 264 can detect a voltage difference between the patterns and store the difference as the second amplitude. In these and other embodiments of the present invention, other data patterns can be used for the low-frequency first data pattern and the high-frequency second data pattern.

As before, the combined channel frequency response can be a combination of both the frequency response of physical channel 220 and a frequency response of the electrical channel including transmitter 210 and CTFE 225 (all shown in FIG. 13.) Accordingly, CTFE 225 can be initially set to have a flat or null frequency response. Alternatively, settings previously provided by control logic 290 (also shown in FIG. 13) can be stored in nonvolatile memory and reused. Alternatively, an initial best guess of settings for CTFE 225 can be used. Alternatively, settings at one extreme can be used as initial values. Alternatively, settings found while locking a phase-locked loop using a method such as the method shown in FIG. 10 can be used. These initial settings can then be modified as necessary using the received amplitudes and ratios thereof. In this example, two amplitudes, or an amplitude and a ratio of two amplitudes, are shown as being used. In these and other embodiments of the present invention, other numbers of amplitudes and ratios can be used.

In these and other embodiments of the present invention, data patterns containing data at different frequencies can be used. For example, the first data can have a relatively low frequency, for example the Nyquist frequency divided by three. The second data can have a relatively high frequency, such as the Nyquist frequency or the Nyquist frequency divided by two. Using these data patterns can provide an indication of the step response of the combined channel at different frequencies. The data can be part of a training sequence or pattern or it can be actual data received by second device 120 (shown in FIG. 13.)

Figure 15:
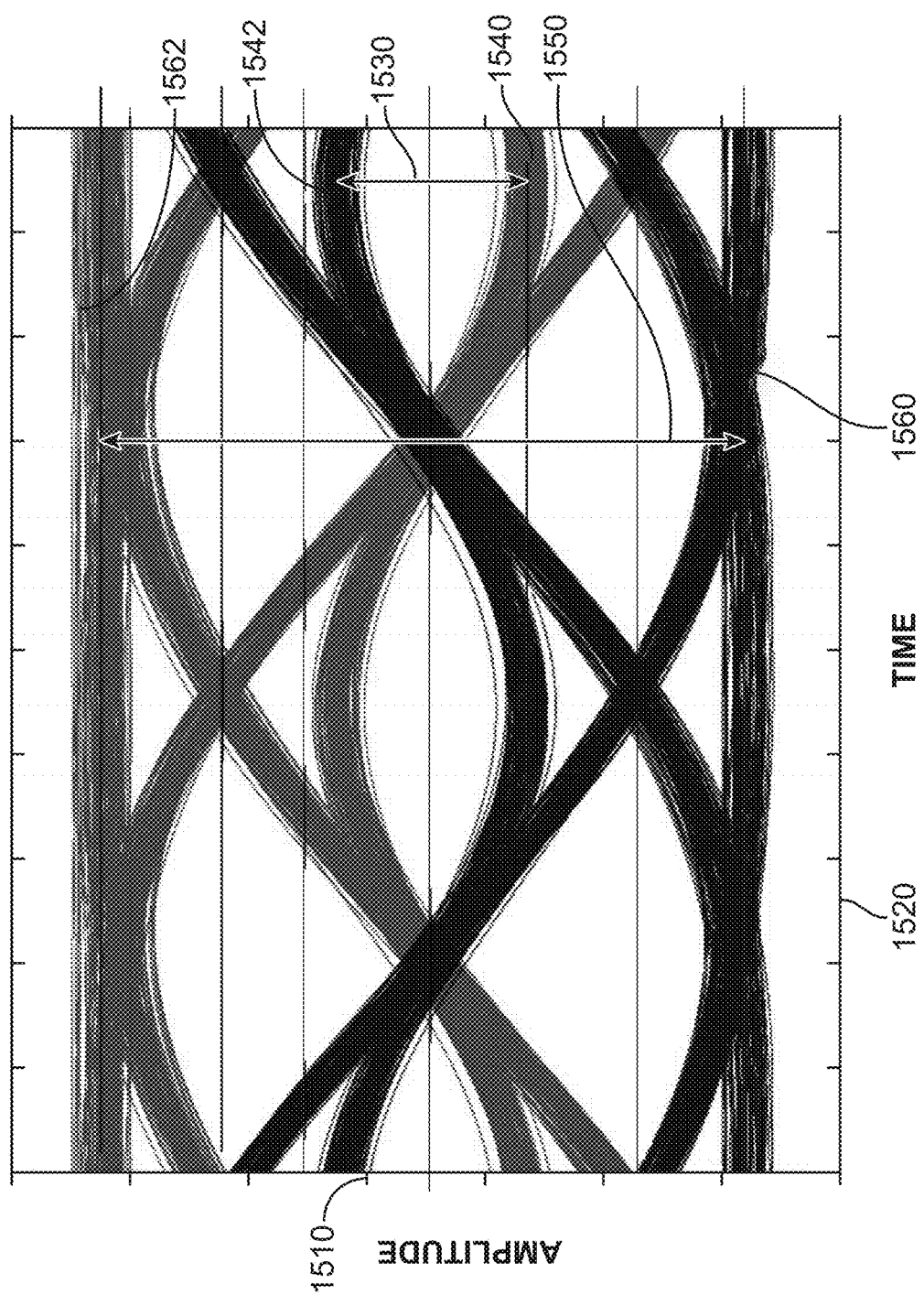
FIG. 15 illustrates an eye diagram of received data that can be used to adjust a CTFE according to an embodiment of the present invention.

FIG. 15 illustrates an eye diagram of received data that can be used to adjust a CTFE according to an embodiment of the present invention. This eye diagram is an eye diagram for received data at an output of CTFE 225 (shown in FIG. 13) and received by amplitude detect slicer 264 and slicer 260 (shown in FIG. 13.) This eye diagram consists of data amplitude 1510 as a function of time 1520. Inter-symbol interference caused by channel bandwidth limitations can reduce amplitudes of rapidly changing data patterns, while allowing slower data patterns to pass with lesser attenuation. Accordingly, an amplitude between a repeated zero pattern that forms level 1560 and a repeated one pattern that forms level 1562 can be measured as amplitude 1550. For example, an amplitude between a repeated zero pattern such as 10001 and a repeated one pattern, such as 01110, can be determined as the amplitude 1550 of the first low-frequency data. Similarly, an amplitude 1530 between zeros in an alternating 101 pattern and ones in an alternating 010 pattern can be determined and used as the amplitude of the second high-frequency data.

If amplitude 1530 is low as compared to amplitude 1550, the de-emphasis of equalizer 230 in CTFE 225 (both shown in FIG. 13) can be increased. If amplitude 1530 is high (as compared to amplitude 1550), the de-emphasis of equalizer 230 can be decreased. If amplitude 1550 is low, the gain of variable-gain amplifier 240 (shown in FIG. 13) can be increased. If amplitude 1550 is high, the gain of variable-gain amplifier 240 can be reduced.

Again, these adjustments can be iterative. For example, lowering the de-emphasis provided by equalizer 230 can increase the low-frequency gain provided by equalizer 230. As a result, the gain of variable-gain amplifier 240 might need to be decreased to compensate. Similarly, raising the de-emphasis provided by equalizer 230 can decrease the low-frequency gain provided by equalizer 230. As a result, the gain of variable-gain amplifier 240 might need to be increased to compensate.

The shape of the eye shown in this figure can be a function of a precursor and a post cursor for each data bit. The post cursor can be compensated for by adjusting amplitude 1530 with respect to amplitude 1550 when the 101 and 010 patterns that form amplitude 1530 are switching at or near the Nyquist frequency.

These and other embodiments of the present invention can determine whether amplitude 1530 and amplitude 1550 are low or high. For example, a threshold can be used for each amplitude, where when the amplitude is above a threshold the amplitude is high, and when the amplitude is below the threshold, the amplitude is low. Alternatively, a window can be used, wherein when an amplitude is in a window no change is made, and when the amplitude is above the window the amplitude is high, and when the amplitude is below the window, the amplitude is low. This can be implemented using a window comparator, hysteresis comparator or other circuit.

Figure 16:
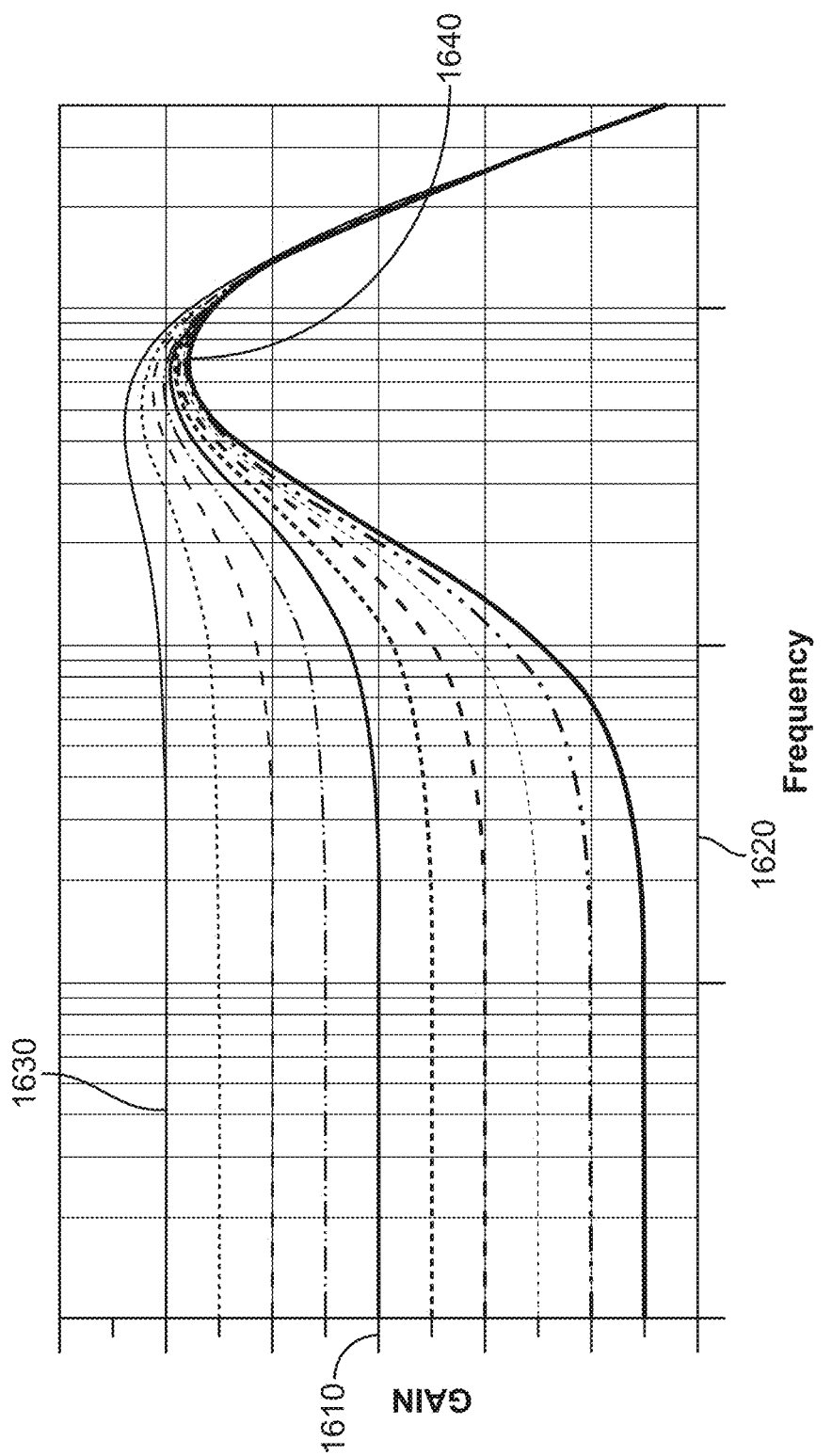
FIG. 16 illustrates characteristics of an equalizer according to an embodiment of the present invention.

FIG. 16 illustrates characteristics of an equalizer according to an embodiment of the present invention. This figure illustrates the frequency response or gain 1610 over frequency 1620 for an equalizer 230 (shown in FIG. 13) according to an embodiment of the present invention. Equalizer 230 can have a variable low-frequency gain 1630. Changes in low-frequency gain 1630 can change an amount of de-emphasis provided by equalizer 230. The de-emphasis can be the difference in gain between the low-frequency gain 1630 and the gain at peak 1640.

In this example, there is a −3 dB roll off below the frequency of the peak 1640, which can be near one-half the Nyquist frequency. In these and other embodiments of the present invention, the roll off below 1640, or the loss between the Nyquist frequency and one-half the Nyquist frequency can be varied based on amplitudes received in FIG. 15.

Figure 17:
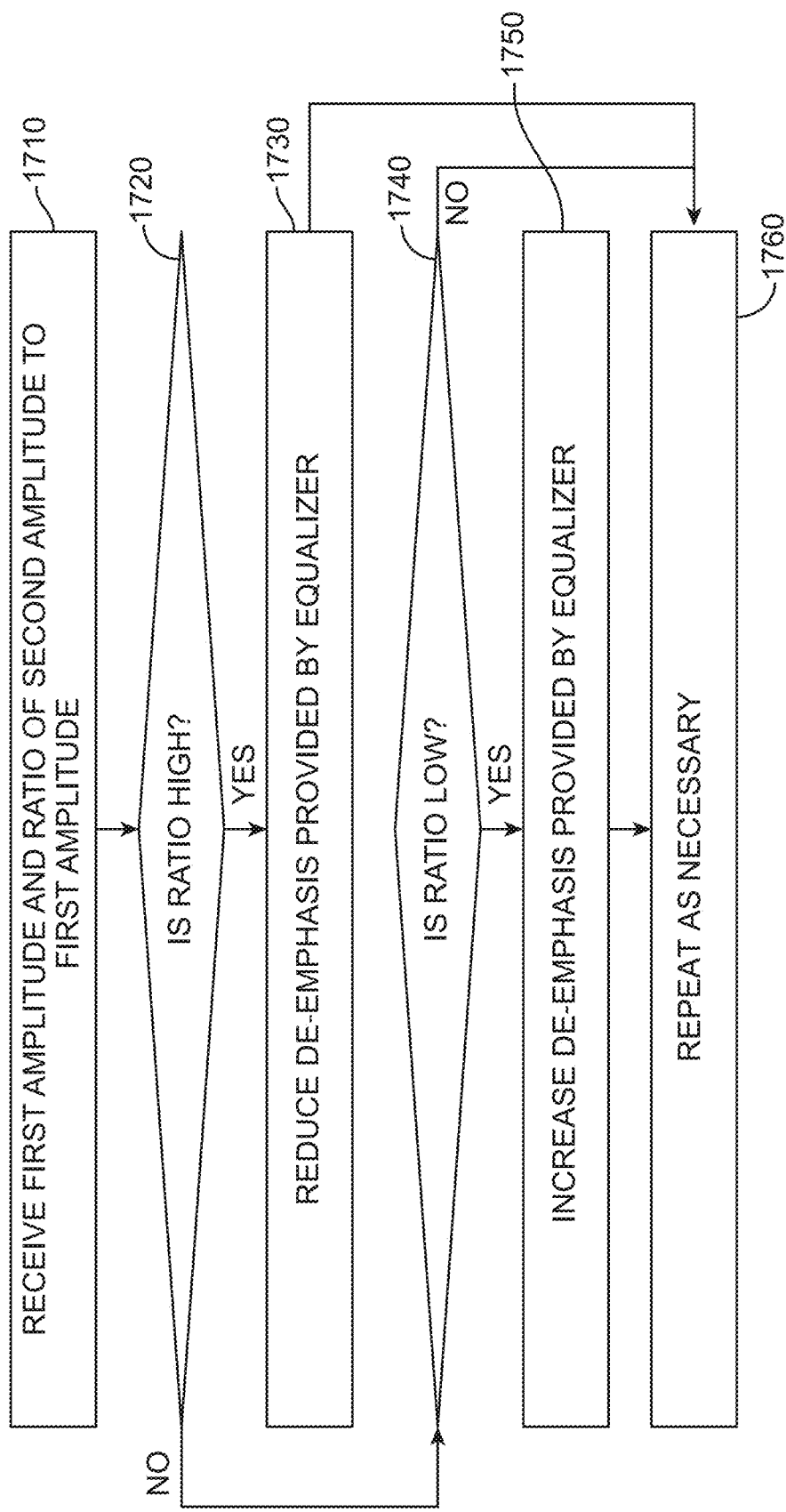
FIG. 17 illustrates a method of adjusting an equalizer and a variable-gain amplifier according to an embodiment of the present invention.

FIG. 17 illustrates a method of adjusting an equalizer and a variable-gain amplifier according to an embodiment of the present invention. In act 1710, a first amplitude and a ratio of a second amplitude to the first amplitude can be received. The first amplitude can be a full-scale amplitude, for example amplitude 1550 as shown in FIG. 15. The second amplitude can be a bandwidth limited amplitude, for example amplitude 1530, as shown in FIG. 15. If the ratio of the second amplitude to the first amplitude is high in act 1720, there might be excessive de-emphasis in the equalizer. Accordingly, if the ratio is excessive in act 1720, the de-emphasis provided by the equalizer can be reduced in act 1730. For example, the low-frequency gain 1630 (shown in FIG. 16) of equalizer 230 (shown in FIG. 13) can be increased to reduce the de-emphasis. Conversely, if the ratio is too low in act 1740, the de-emphasis can be increased in act 1750. For example, the low-frequency gain 1630 of equalizer 230 can be decreased to increase the de-emphasis. These acts can be repeated as necessary in act 1760.

In these and other embodiments of the present invention, the amplitude of the received first data and received second data can be done in various ways. For example, pattern filter 272 (shown in FIG. 13) can detect a low-frequency data pattern, such as the 01110 or 10001 patterns. Once such a pattern is detected, amplitude detect slicer 264 (shown in FIG. 13) can detect a voltage difference between the 01110 and 10001 patterns and store the difference as the first amplitude. Similarly, pattern filter 272 can detect a low-frequency data pattern, such as the 010 or 101 patterns. Once such a pattern is detected, amplitude detect slicer 264 can detect a voltage difference between the patterns and store the difference as the second amplitude. In these and other embodiments of the present invention, other data patterns can be used for the low-frequency first data pattern and the high-frequency second data pattern.

Again, these adjustments can be iterative. For example, lowering the de-emphasis provided by equalizer 230 (shown in FIG. 13) can increase the low-frequency gain provided by equalizer 230. As a result, the gain of variable-gain amplifier 240 (shown in FIG. 13) might need to be decreased to compensate. Similarly, increasing the de-emphasis provided by equalizer 230 can decrease the low-frequency gain provided by equalizer 230. As a result, the gain of variable-gain amplifier 240 might need to be increased to compensate.

These and other embodiments of the present invention can determine whether amplitude 1530 and amplitude 1550 are low or high in various ways. For example, a threshold can be used for each amplitude, where when the amplitude is above a threshold the amplitude is high, and when the amplitude is below the threshold, the amplitude is low. Alternatively, a window can be used, wherein when an amplitude is in a window no change is made, and when the amplitude is above the window the amplitude is high, and when the amplitude is below the window, the amplitude is low. This can be implemented using a window comparator, hysteresis comparator or other circuit.

In some circumstances, it can be advantageous to adjust a waveform provided by a transmitter to the channel. This transmitted waveform adjustment can pre-compensate for non-ideal characteristics of channel 220, thereby simplifying the equalization task required by the receiver circuits. An example is shown in the following figure.

Figure 18:
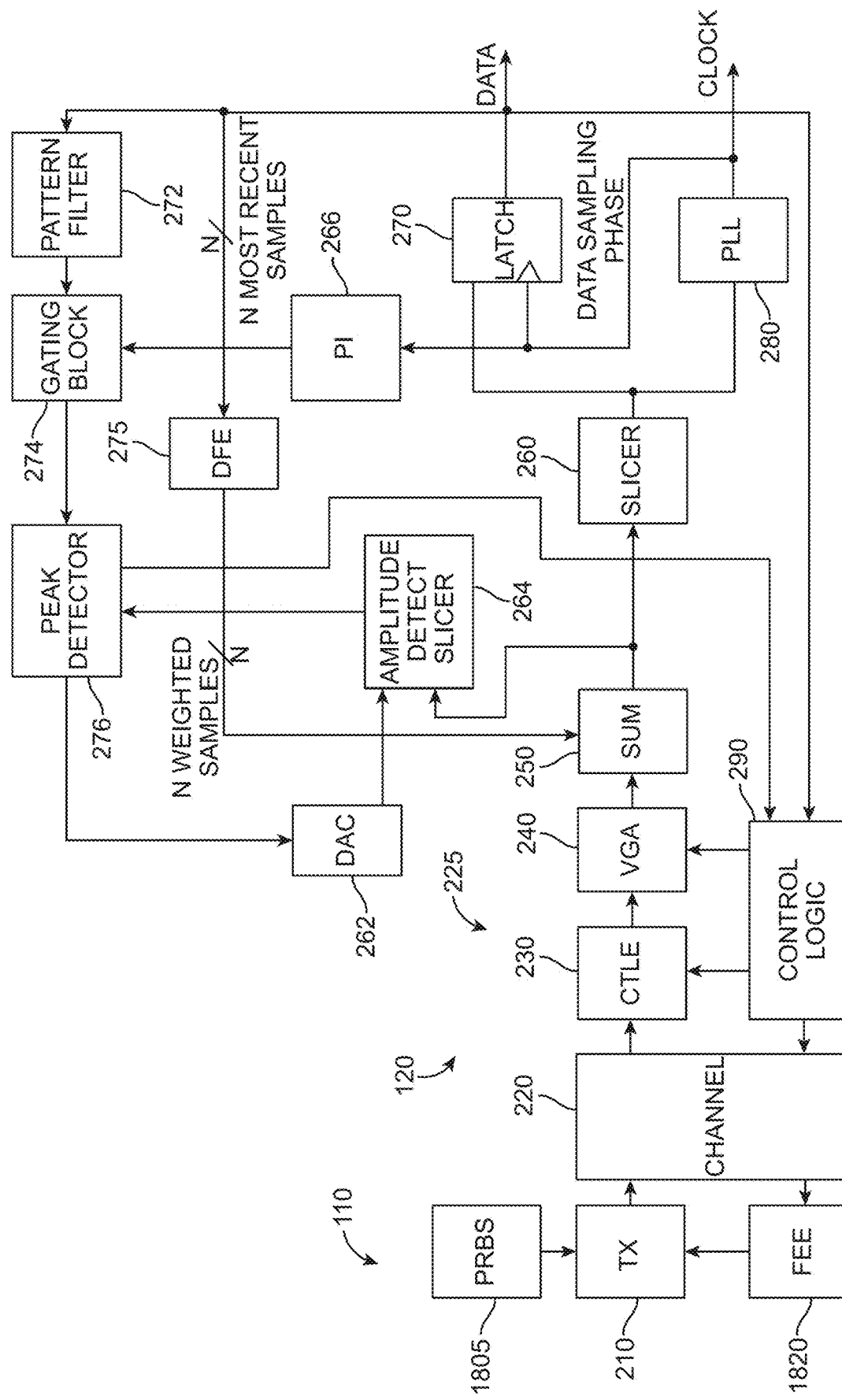
FIG. 18 is a block diagram for a data path from a first device to a second device according to an embodiment of the present invention.

FIG. 18 is a block diagram for a data path from a first device to a second device according to an embodiment of the present invention. This block diagram can be functionally the same or similar to the block diagram of FIG. 13 with the addition of a feedback path from control logic 290 to transmitter circuitry in the first device 110.

Specifically, control logic 290 can also provide information through channel 220 to feed-forward error correction circuit 1820 in first device 110. Feed-forward error correction circuit 1820 can adjust the waveform provided to channel 220 by transmitter 210. The information provided by control logic 290 to feed-forward error correction circuit 1820 can be coefficients feed-forward error correction circuit 1820, data from which coefficients for the feed-forward error correction circuit 1820 can be derived, or other types of data.

In these and other embodiments of the present invention, specific data patterns can be detected by pattern filter 272 and provided by gating block 274 to peak detector 276. For purposes of adjusting feed-forward error correction circuit 1820, the data patterns can be a bit followed by two subsequent bits, where the different data patterns correspond to all or some of the possible bit combinations. Peak detector 276 can receive amplitude information along with this pattern information and provide data to control logic 290. Control logic can then provide information to feed-forward error correction circuit 1820 in first device 110 via channel 220. For example, the information provided can include a previous bit c1, the main tap c0, the a bit c-1, and a second next bit c-2. These bits can be indicated as H-2, H-1, H0, and H1.

These and other embodiments of the present invention can provide equalizers and related circuits that can be readily implemented using a minimal amount of logic gates. This can reduce component size, save power, speed design, and improve yields. While examples are shown utilizing specific bit transitions and specific equalizer characteristics, these and other embodiments of the present invention can utilize different bit transitions and specific equalizer characteristics.

Embodiments of the present invention can provide equalizers, continuous-time front ends, and other circuits that can be used in various types of devices, such as portable computing devices, tablet computers, desktop computers, laptops, all-in-one computers, wearable computing devices, cell phones, smart phones, media devices, storage devices, portable media players, navigation systems, monitors, power supplies, adapters, remote control devices, chargers, and other devices. Data can be transmitted and received using connector inserts and connector receptacles that can provide pathways for signals and power compliant with various standards such as one of the Universal Serial Bus standards including USB Type-C, High-Definition Multimedia Interface, Digital Visual Interface, DisplayPort, Thunderbolt, Lightning, Directed Automated Random Testing, universal asynchronous receiver/transmitters, clock signals, power signals, and other types of standard, non-standard, and proprietary interfaces and combinations thereof that have been developed, are being developed, or will be developed in the future.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of setting a characteristic of a continuous-time front end in a receiver, the method comprising:
with the receiver, receiving a first pseudo-random bit stream;
detecting a first data pattern in the first pseudo-random bit stream;
determining a first amplitude of the detected first data pattern;
detecting a second data pattern in the first pseudo-random bit stream;
determining a second amplitude of the detected second data pattern;
determining a ratio of the second amplitude to the first amplitude; and
using the ratio of the second amplitude to the first amplitude to set the characteristic of the continuous-time front end.

2. The method of claim 1 wherein the first amplitude and the second amplitude are determined after the first data pattern and the second data pattern are output by the continuous-time front end.

3. The method of claim 1 wherein the first data pattern comprises a low-frequency data pattern and the second data pattern comprises a high-frequency data pattern.

4. The method of claim 3 wherein the characteristic comprises a de-emphasis of an equalizer in the continuous-time front end.

5. The method of claim 1 wherein the ratio of the second amplitude to the first amplitude is used to adjust an amount of de-emphasis provided by an equalizer in the continuous-time front end.

6. The method of claim 5 wherein the equalizer comprises a continuous-time-linear equalizer.

7. The method of claim 1 further comprising, with the receiver:
receiving a subsequent second pseudo-random bit stream;
detecting a subsequent first data pattern in the second pseudo-random bit stream;
determining a third amplitude of the detected subsequent first data pattern;

detecting a subsequent second data pattern in the second pseudo-random bit stream;
determining a fourth amplitude of the detected subsequent second data pattern;
determining a ratio of the fourth amplitude to the third amplitude; and
using the ratio of the fourth amplitude to the third amplitude to adjust the characteristic of the continuous-time front end.

8. The method of claim 1 further comprising:
providing a first gain setting to a variable-gain amplifier in the continuous-time front end;
determining a third amplitude of the received first pseudo-random bit stream;
providing a second gain setting to the variable-gain amplifier;
determining a fourth amplitude of the received first pseudo-random bit stream;
using the third amplitude and the fourth amplitude to determine whether the variable-gain amplifier is in compression; and
using the determination of whether the variable-gain amplifier is in compression to set the gain of the variable-gain amplifier.

9. The method of claim 1 further comprising:
before receiving the first pseudo-random bit stream, receiving a first plurality of tones;
for each tone, measuring an amplitude of the received tone after the received tone has been output by the continuous-time front end; and
using the measured amplitudes of the received tones to adjust the characteristic of the continuous-time front end.

10. The method of claim 9 wherein the characteristic of the continuous-time front end is a de-emphasis of an equalizer in the continuous-time front end.

11. A method of setting a frequency response characteristic of a receiver, the method comprising:
with the receiver having an input connected to a physical channel, receiving pseudo-random data;
determining an initial amplitude of the received pseudo-random data;
decreasing a de-emphasis of an equalizer in the receiver;
detecting an increase in amplitude of the received pseudo-random data; and
using the detected increase in amplitude to set the frequency response characteristic of the receiver.

12. The method of claim 11 wherein the frequency response characteristic is the de-emphasis of the equalizer and the received initial amplitude of the pseudo-random data is determined after the pseudo-random data has been output by the equalizer.

13. The method of claim 11 wherein the de-emphasis of the equalizer is decreased in steps, and the de-emphasis at a step where the detected increased amplitude as compared to the initial amplitude reaches a first ratio is used to set the frequency response characteristic of the receiver.

14. The method of claim 11 wherein the de-emphasis of the equalizer is decreased in steps, and the de-emphasis at a step before the increase in amplitude of the received pseudo-random data is detected is used to set the frequency response characteristic of the receiver.

15. The method of claim 11 wherein a phase-locked loop in the receiver locks after the frequency response characteristic of the receiver is set.

16. The method of claim 11 wherein the receiver is located in a linear redriver.

17. The method of claim 16 wherein the linear redriver is located in a plug of a cable.

18. The method of claim 16 wherein the linear redriver does not include a phase-locked loop.

19. The method of claim 16 further comprising:
providing a first gain setting to a variable-gain amplifier in the receiver;
determining a third amplitude of the received pseudo-random data;
providing a second gain setting to the variable-gain amplifier;
determining a fourth amplitude of the received pseudo-random data;
using the third amplitude and the fourth amplitude to determine whether the variable-gain amplifier is in compression; and
using the determination of whether the variable-gain amplifier is in compression to set the gain of the variable-gain amplifier.

20. A receiver comprising:
a continuous-time front end to receive a pseudo-random bit stream;
a pattern filter to detect a first data pattern in the pseudo-random bit stream;
a peak detector to determine a first amplitude of the detected first data pattern;
the pattern filter to detect a second data pattern in the pseudo-random bit stream;
the peak detector to determine a second amplitude of the detected second data pattern; and
control logic to determine a ratio of the second amplitude to the first amplitude and to use the ratio of the second amplitude to the first amplitude to set a characteristic of the continuous-time front end.

21. The receiver of claim 20 wherein the characteristic of the continuous-time front end is a de-emphasis of an equalizer in the continuous-time front end.

* * * * *